(12) United States Patent
Khan

(10) Patent No.: US 11,711,347 B2
(45) Date of Patent: Jul. 25, 2023

(54) REGISTERED ENCRYPTED ELECTRONIC MESSAGE AND REDACTED REPLY SYSTEM

(71) Applicant: Zafar Khan, Los Angeles, CA (US)

(72) Inventor: Zafar Khan, Los Angeles, CA (US)

( * ) Notice: Subject to any disclaimer, the term of this patent is extended or adjusted under 35 U.S.C. 154(b) by 118 days.

(21) Appl. No.: 16/866,135

(22) Filed: May 4, 2020

(65) Prior Publication Data

US 2021/0058377 A1  Feb. 25, 2021

Related U.S. Application Data

(60) Provisional application No. 62/833,022, filed on Apr. 12, 2019.

(51) Int. Cl.
| | | |
|---|---|---|
| *H04L 9/40* | (2022.01) | |
| *G06F 16/22* | (2019.01) | |
| *G06F 16/955* | (2019.01) | |
| *G06F 40/205* | (2020.01) | |
| *H04L 51/42* | (2022.01) | |

(52) U.S. Cl.
CPC ......... *H04L 63/0428* (2013.01); *G06F 16/22* (2019.01); *G06F 16/955* (2019.01); *G06F 40/205* (2020.01); *H04L 51/42* (2022.05); *H04L 63/08* (2013.01); *H04L 63/105* (2013.01)

(58) Field of Classification Search
CPC .. H04L 63/105; H04L 63/0428; G06F 40/205
See application file for complete search history.

(56) References Cited

U.S. PATENT DOCUMENTS

| | | | |
|---|---|---|---|
| 9,667,639 B1* | 5/2017 | Pierson | H04L 63/1416 |
| 2002/0026487 A1 | 2/2002 | Ogilvie et al. | |
| 2005/0081032 A1* | 4/2005 | Struik | H04L 63/0876 713/166 |
| 2009/0150675 A1* | 6/2009 | Cook | H04L 69/08 713/168 |
| 2010/0229246 A1 | 9/2010 | Warrington et al. | |
| 2011/0239113 A1 | 9/2011 | Hung et al. | |
| 2014/0344382 A1 | 11/2014 | Schmid | |
| 2016/0292415 A1* | 10/2016 | Adams | G06F 21/6209 |
| 2017/0223037 A1 | 3/2017 | Singh et al. | |

FOREIGN PATENT DOCUMENTS

| | | | | |
|---|---|---|---|---|
| WO | WO-2012013003 A1 * | 2/2012 | | H04L 63/105 |
| WO | WO-2019195479 A1 * | 10/2019 | | H04L 43/0852 |

OTHER PUBLICATIONS

WIPO, International Preliminary Report on Patentability, dated Sep. 28, 2021.

* cited by examiner

*Primary Examiner* — Esther B. Henderson
(74) *Attorney, Agent, or Firm* — Fitzgerald IP Law; John K. Fitzgerald, Esq.

(57) ABSTRACT

A method and system for processing an email having redacted content, and/or where the message content has been encrypted and recorded as encrypted, is provided.

8 Claims, 27 Drawing Sheets

Redacted Reply™ - Filtering at Security Gateway on Outbound from Sender or Inbound to RPost Server Redacted Reply™ - Sender Settings Option 1: System attaches Redacted Reply content to the outbound message as an text file
(Option to Select File Type (i.e. HTML) and option to separately encrypt attachment file separately Option 2: System inserts a link to the Redacted Reply text inside the email body.

A. Browser Option: Open a browser window with the Redacted Reply text when the link is clicked.

B. Image Option: System removes content and displays image inside email, image containing redacted content;

FIG. 6

② The email is sent securely to the RPost Networks with the Redacted Reply text:
  1. In the body of the email inside the two ^ symbols, or,
  2. In the encrypted data file sent by the R Post App.

Redacted Reply™ - RPost Networks

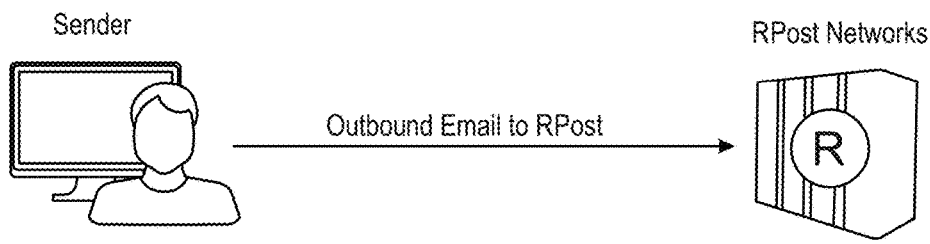

The RPost Networks extracts the Redacted Reply text from inside the two ^ symbols (configurable) or the data file sent from the R Post App and processes the email according to the customer or user settings.

Settings
Option 1: Attach Redacted Reply content to the outbound message as an text file.
Option 2: Insert a link to the Redacted Reply text inside the email body.

FIG. 11

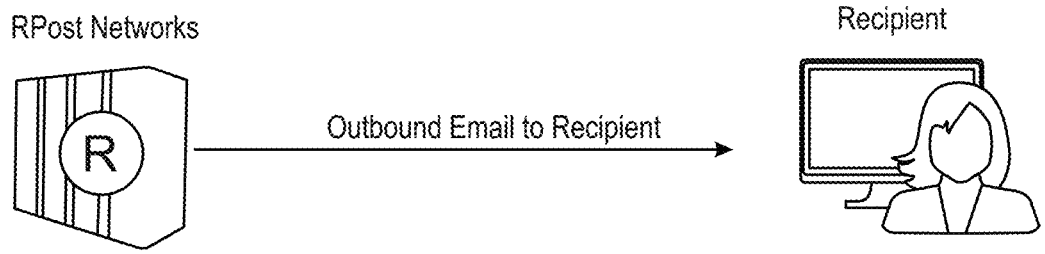
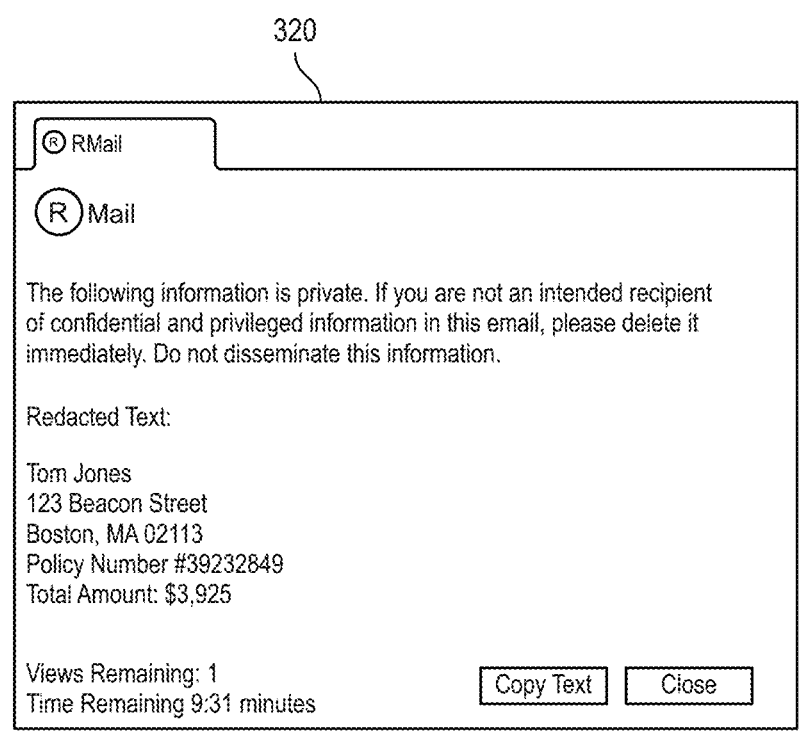
FIG. 14

Redacted Reply™ - Recipient
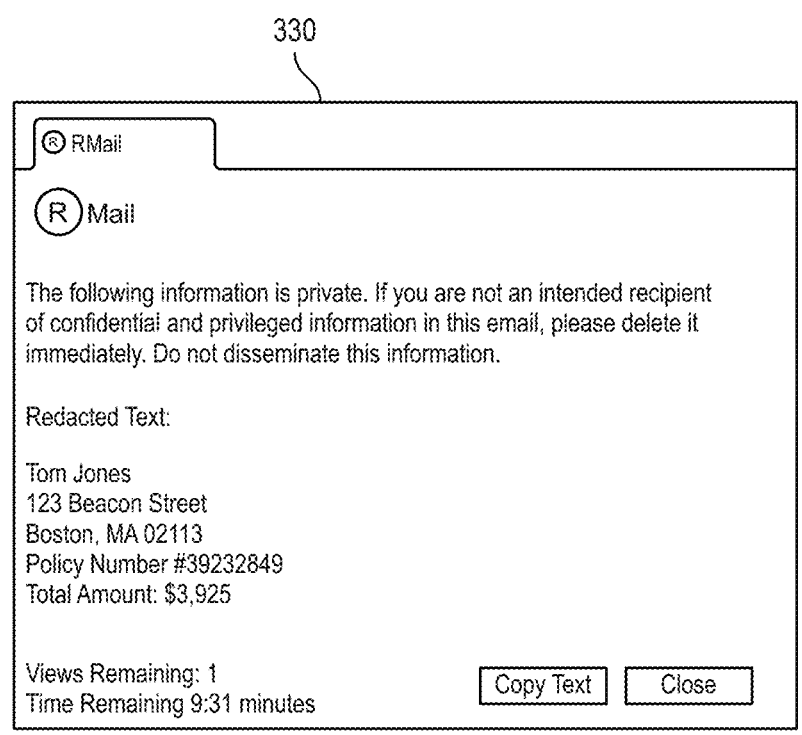
FIG. 15

Redacted Reply™ - RPost for Outlook Redacted Reply View

R Mail - Sending Options    (R)Mail

Track & Prove    ☐ RPX
- ◉ Marked as a Registered Email message
- ○ Unmarked ☐ Encrypt    Advanced
- ○ Automatic
- ○ Custom
- [Password]  ☐

☐ E-Sign - Send for signature
- ○ Hand Sign
- ○ Email Sign

☐ Large File Transfer (LargeMail)

○ Side Note    Send a private note only visible to the Cc and/or Bcc recipients
- ☐ Cc
- ☐ Bcc
- ◉ Redact    <--- Select Recipient

[Send]    [Cancel]    [More >>]    (?)

---

RMail - Sending Options    (R)Mail

Track & Prove    ☐ RPX
- ◉ Marked as a Registered Email message
- ○ Unmarked ☐ Encrypt    Advanced
- ○ Automatic
- ○ Custom
- [Password]  ☐

☐ E-Sign - Send for signature
- ○ Hand Sign
- ○ Email Sign

☐ Large File Transfer (LargeMail)

○ Side Note    Insert text you would like to redact from the email body. This text will be attached to the email to avoid being sent in an unsecure reply
- ☐ Cc
- ☐ Bcc
- ◉ Redact

[Send]    [Cancel]    [More >>]    (?)

Using Redact Option Can be set to Pre-SelectEncryption Option

FIG. 17

Received: from abc.luxsci.com ([1.1.1.1])
        by def.luxsci.com (8.14.4/8.13.8) with ESMTP id r7JEfLgH003867
        (version=TLSv1/SSLv3 cipher=DHE-RSA-AES256-SHA bits =256 verify=NOT)
        for <user-xyz@def.luxsci.com>; Mon, 19 Aug 2013 10:41:21 -0400

Received: from abc.luxsci.com (localhost.localdomain [127.0.0.1])
        by abc.luxsci.com (8.14.4/8.13.8) with ESMTP id r7JEfK0Z030182
        for <user-xyz@def.luxsci.com>; Mon, 19 Aug 2013 09:41:20 -0500

Received: from (mail@localhost)
        by abc.luxsci.com (8.14.4/8.13.8/Submit) id r7JEfKXD030178
        for user-xyz@def.luxsci.com; Mon, 19 Aug 2013 09:41:20 -0500

FIG. 22

Example 1. If:

(received from sender) = Best (sent to recipient) = Acceptable

Result = Acceptable

Example 2. If:

(received from sender) = Best (sent to recipient) = Fail

Result = Fail

Example 3. If:

(received from sender) = Acceptable (sent to recipient) = Acceptable

Result = Acceptable

FIG. 23

Registered Encryption™ Report for Sender

| Original Sender | Inbound Sent Secure Identifier | Inbound Received Secure Identifier | Time Accepted | Status | End Recipient | Outbound Sent Secure Identifier | Outbound Received Secure Identifier | Time Accepted | Subject, Message Ids, Times, etc. | Status |
|---|---|---|---|---|---|---|---|---|---|---|
| bob@company.com | FQDN Domain, IP | TLSv1.2@server1 | 10:01:10 UTC | Best | sue@network.com | TLSv1.2 | IP FQDN & Recipient | 10:01:15 UTC | Other TransactionData | Best |
| bob@company.com | Sender+FQDN+1 | RPPKI+ TSLv1.1@Server2 | 10:05:25 UTC | Acceptable | jim@home.com | PDF-AES256+TLSv1.0 | Recipient Mailbox | 10:05:30 UTC | Other TransactionData | Best |
| bob@company.com | Sender+FQDN+1 | RPPKI+ TSLv1.1@Server3 | 10:10:15 UTC | Fail | jim@home.com | PDF-AES256+TLSv1.0 | Recipient Mailbox | 10:10:20 UTC | Other TransactionData | Best |
| Hash of Report, Digital Signature of Report, Metadata embedded in report | | | | | | | | | | |

FIG. 24

Registered Encryption™ Report for Sender

SENDER TO RPOST

| Status | Origin Sender | End Recipient | Sent Secure Identifier, Last Hop | Received Secure Identifier | Time Accepted |
|---|---|---|---|---|---|
| Best | Bob@company.com | Sue@network.com | FQDN Domain, IP | TLS1.2@Server 1 | 10:01:10 UTC |
| Fail | Bob@company.com | Jim@home.com | Sender+FQDN+IP | RPPki+TLS1.2@Server 3 | 10:02:15 UTC |

RPOST TO RECIPIENT

| Status | Origin Sender | End Recipient | Sent Secure Identifier, Last Hop | Received Secure Identifier | Time Accepted |
|---|---|---|---|---|---|
| Best | Bob@company.com | Sue@network.com | TLS1.2 | IP FQDN & Recipient | 10:02:10 UTC |
| Best | Bob@company.com | Jim@home.com | PDFAEs256+TLS1.0 | Recipient Mailbox | 10:04:15 UTC |

SECURITY REPORT

Bob to Sue  Subject, Message ID, Time

Bob to Jim  Subject, Message ID, Time

Hash of Report, Digital Signature of Report

Metadata embedded in report

FIG. 25

REGISTERED ENCRYPTED ELECTRONIC MESSAGE AND REDACTED REPLY SYSTEM

CROSS-REFERENCE TO RELATED APPLICATIONS

This application claims priority to the earlier filed U.S. Provisional Application No. 62/833,022, filed on Apr. 12, 2019, entitled "Verification of Encrypted Electronic Message Delivery and Preventing Accidental Disclosure of Sensitive Message Parts in Replies" which is incorporated reference herein in its entirety.

FIELD

This disclosure relates to electronic message security within the category of private delivery of electronic messages, and the sub-category of privacy compliance. More particularly, the disclosure relates to electronic message security within the category of private delivery of electronic messages, and the sub-category of privacy compliance, in terms of protecting a sender or sender organization against claims of a data breach due to a claim that a sent message was not sent securely in terms of privacy; and to provide audit-ready records to verify secure delivery of electronic messages in case of a data privacy compliance audit.

BACKGROUND

Mail assumed electronic format in 1965 and was given the name "Email". Email started as a way for multiple users of a time-sharing mainframe computer to communicate with each other. Email was quickly extended to become 'network email', allowing users to pass messages between different computers by at least 1966. Email today has become a communications tool that is simple enough for individuals to use regardless of their level of technical knowledge or understanding of how email works.

Today, email (electronic message transmission systems and protocols) are often relied up for important communications among people and used to instruct people to do things or transmit sensitive financial, health-related, strategic, or legal information that a sender may not want to be available to parties other than the email recipient.

In many states, countries, and industries, there are regulations that require senders of certain information to send the information using systems that transmit the electronic message in a manner more private than standard email transmissions. One example is the US health care privacy regulation entitled, Health Insurance Portability and Accountability Act of 1996 (HIPAA) in the United States that provides data privacy and security provisions for safeguarding medical information. Another example is the European General Data Protection Regulation (GDPR) which includes provisions for email privacy compliance. GDPR defines what is to be achieved with compliance rather than how the requirements should be fulfilled. Consequently, it does not state a requirement to use a specific method of encrypting email, but it does require the handler of consumer non-public and personal information to maintain not only privacy of that information, but also the ability to demonstrate compliance with the privacy requirements. These requirements are discussed detail in GDPR Article 5 Clause 1(f) and 2, and Article 32 Clause 1(a) and 1(d) which focus on the requirement to protect personal data during transmission with the ability to demonstrate fact of protection of personal data.

While a normal email and electronic message system user knows how to send, receive, read, reply-to, and forward an electronic message (email refers to any electronic message transmitted using electronic message transmission protocols), a normal email user neither knows how to transmit an email in a more secure or private manner, nor knows how to verify if a message is to be sent or was sent using a more secure or private manner as compared to a standard email. Upon receiving an email, a normal email user would not know how to verify if that email was received using a secure transmission or encrypted transmission. A normal email user will not know how to prevent a recipient in receipt of the content of their sent secure transmission, to prevent them from replying insecurely and exposing their originally sent content that may be in the email thread.

More advanced email users may configure their email program to automatically filter email to be placed in certain folders, or mark email with various levels of importance. Even more advanced email users may set up systems to transmit email in a more private manner than in a standard email transmission; a standard email transmission being defined as an electronic message transmission sent using electronic messaging protocols such as SMTP, ESMTP, SMS, SMPP, MMS, HTTP, HTTPS, and combinations such as with SSL, TLS, and others.

Some of these email users or their email operators may install third party programs or encryption keys inside their existing email program to assist them in dealing with the various known and common security threats associated with email. Users (senders of email and/or recipients) or email system administrators may add software or enable settings at the email server, email gateway, or email user interface (commonly referred to as "Email Client"). These add-on software programs may add options to transmit messages in a more private manner than using standard messaging protocols. Some user may opt to upload their message to a secure server that would send a link to retrieve or view the message, and some may opt to compose their message in a secure program accessed securely in a web browser and then transmit. Some systems may send using secure application programming interfaces including protocols such as SOAP, REST, EDI exchange protocols, among others.

There are a variety of methods of transmitting messages in a more private manner than using standard email transmission protocols. Some of these methods use PGP, PKI, AES 256-Bit PDF, Link-Retrieval, HTML Wrappers, etc. with or without sending with a secure connection like TLS, SSL, or HTTPS. There are other protocols in secure messaging systems including EDI, SMS, MMS, etc.

What is needed is a means for a sender or sending organization, or for a receiver, or for a receiver replying to a sender, to have a means to have (1) assurance of private transmission from a sending point to a receiving point (the sending end-point and receiving end-point may be different in different circumstances), (2) record fact of private transmission end-to-end, (3) provide a means for third-party verification of fact of private transmission, end-to-end, on a message-by-message basis, and (4) redacting and optionally additionally recording the redaction of message content or part of the message content upon a recipient reply (for example, so a reply by the recipient will not transmit the designated private information in the recipient reply). The present invention satisfies these and other needs.

SUMMARY OF THE INVENTION

In its most general aspect, the disclosure provides a system and method for protecting a sender or sender organization from the potential of breaches in information privacy policies that require certain messages or certain parts of messages to be transmitted in an encrypted manner or in a manner that minimizes likelihood of accidental exposure of private information. In another aspect, the disclosure provides a system and method for protecting the sender or sender organization from a third-party claim that a message or a part of a message was not transmitted in an encrypted manner.

In another aspect, the disclosure sets forth a system and method that provides a sender or sender organization visibility and proof of fact of encrypted delivery for peace of mind or protection in the case of privacy compliance audit, and visibility and proof of fact of receipt of an inbound message having been transmitted with encrypted delivery from the sender or sender agent. In one exemplary aspect, the sender may be protected when a recipient receives a message using a secure message transmission process that permits the recipient to reply to the message potentially exposing the originally received message content if the reply includes the message thread and is returned without a secure transmission process.

In still another aspect, the disclosure provides audit-ready records to verify secure delivery of electronic messages to better manage messaging policies and to provide readily accessible information in case of a data privacy compliance audit. In an aspect, the disclosure provides that the systems and methods set forth herein may have three portions that may be implemented individually, each implemented partially, or implemented together.

In another aspect, the disclosure provides a sender or sending organization (or a receiver or a receiver replying) with a record of fact of encrypted delivery of an electronic message from one endpoint to a receiving endpoint. In another aspect, the disclosure further provides creating a record that includes sufficient information related to the private delivery such that it can be relied on as proof of fact of encrypted delivery.

In yet another aspect, the disclosure provides a means for third parties to authenticate the record of fact of private delivery. In still another aspect, the disclosure creates a record to provide the sender of a message opportunities to make a reply to the sender's message returned in a more private manner (so as not to expose the content or a part of the sender's original information sent if contained in the reply message thread).

In yet another aspect, the disclosure provides a means for the sender or third parties to authenticate the record of fact of certain content sent having been redacted or removed from a recipient's reply message thread.

In another aspect, the disclosure provides a system for providing a redacted reply service for an email message, comprising a server remote from a recipient programmed to: receive a message containing content marked by a sender for redaction, determine that the message contains content marked for redaction, determine if there are any settings established by the sender of the message that are to be used in processing the received message, remove content marked for redaction in accordance with the determined settings, reformat the message according to the determined settings, transmit the reformatted message, and information associated with the removed content to the recipient. In another aspect, the server is further programmed to store the removed content in a database stored in a memory. In still another aspect, the server is programmed to add a viewing limitation to the removed content to limit various parameters associated with viewing of the stored removed content. In another aspect, the transmitted information associated with the removed content is a link providing access to the removed content stored in the database.

In yet another aspect, the server further programmed to add a link to the transmitted reformatted message that includes reply control information that limits the content that a reply message based on the transmitted reformatted message may contain. In one aspect, the control information prevents the reply from including the information associated with the removed content. In another aspect, the control information includes information established by the sender.

In still another aspect, the disclosure provides a system for providing a registered encryption service for an email system, comprising a server remote from a recipient programmed to receive a message from a sender, parse one or more headers of the received message, store information associated with the one or more parsed headers in a database according to a security level or other data provided by the sender, secure the received message for transmission to an intended recipient, transmit the secured message, and information associated with the secured message, to the recipient, process the information stored in the database to determine the security level of the message, and generate a report related to the transmitted secured message and including an indication of the determined security level. In one aspect, the generated report is an authentication-ready report. In another aspect, the authentication-ready report is transmitted to the sender.

In yet another aspect, the server is further programmed to store a record of a method used to secure the received message in a database stored in a memory. In another aspect, the server is further programmed to store a record including a portion of a transmission protocol used to transmit the secured message to the recipient in a database stored in a memory. In yet another aspect, the server is further programmed to store a record of a method used to secure the message delivered to recipient in a database stored in a memory. In still another aspect, the server is further programmed to store a record of a method used by the sender or sender server to secure the message received from the sender and the method used to secure the message sent to recipient, in a database stored in a memory. In another aspect, the server is further programmed to record the enablement of the redaction of content from the message sent to the recipient.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The following detailed description and examples are provided for the purpose of non-exhaustively describing some, but not necessarily all, examples or embodiments of the disclosure, and shall not limit the scope of the disclosure in any way.

FIG. 6. is depicts exemplary sender settings used in accordance with the various embodiments of the disclosure.

FIG. 11 is a schematic diagram of one aspect of the embodiment of FIG. 7.

FIG. 14 is a schematic diagram of one aspect of the embodiment of FIG. 11.

FIG. 15 is a schematic diagram of one aspect of the embodiment of FIG. 11.

FIG. 17 is a graphical view of menus of sender setting in accordance with the various embodiments of the disclosure.

FIG. 22 is a schematic view of one aspect of the embodiment of FIG. 21.

FIG. 23 is a schematic view of one aspect of the embodiment of FIG. 21.

FIG. 24 is a graphical view of a report generated in accordance with the present disclosure.

FIG. 25 is a graphical view of a report generated in accordance with the present disclosure.

DETAILED DESCRIPTION OF THE PREFERRED EMBODIMENTS

Figure 1:
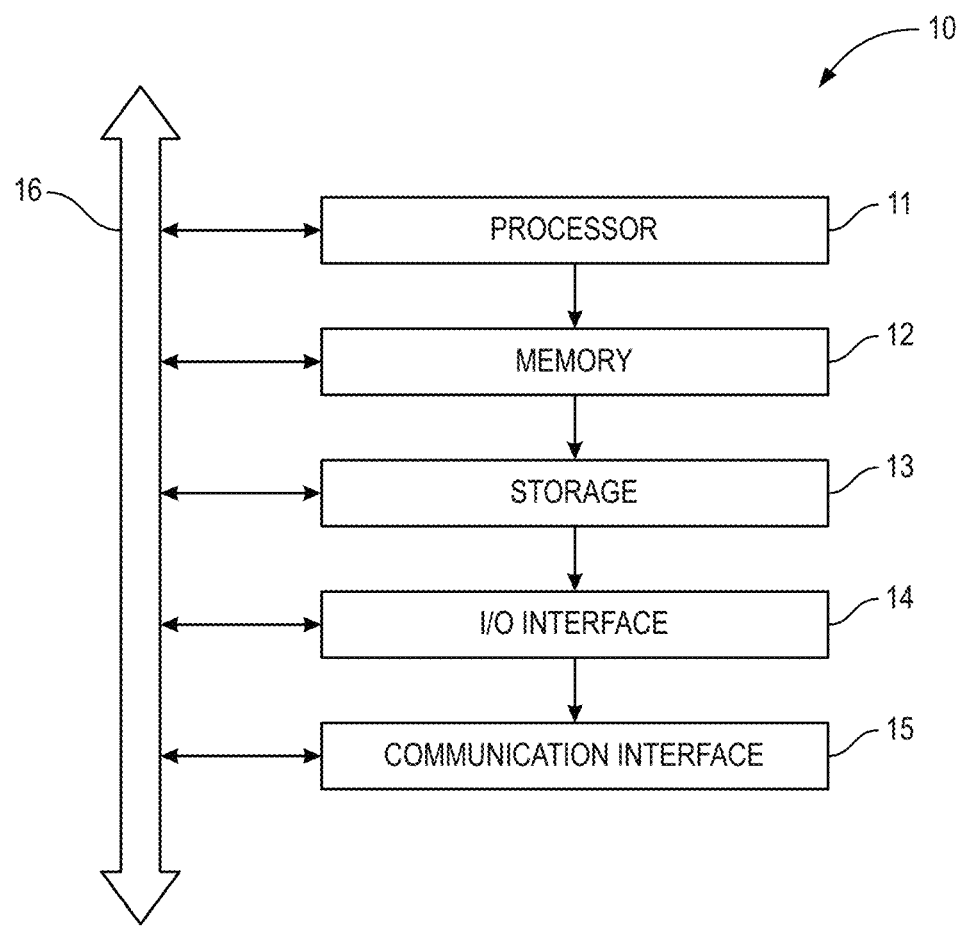
FIG. 1 is a schematic diagram of a computer or processing system that may specifically modified by the various embodiments of the present disclosure to carry out a registered redaction or registered encryption of a message sent by sender to a recipient via a network.

Mail assumed electronic format in 1965 and was given the name "Email". Email started as a way for multiple users of a time-sharing mainframe computer to communicate with each other. Email was quickly extended to become 'network email', allowing users to pass messages between different computers by at least 1966. Email today has become a communications tool that is simple enough for individuals to use regardless of their level of technical knowledge or understanding of how email works.

Today, email is often relied up for important communications among people and used to instruct people to do things or transmit sensitive financial, health-related, strategic, or legal information that a sender may not want to be available to parties other than the email recipient.

In many states, countries, and industries, there are regulations that require senders of certain information to send the information using systems that transmit the electronic message in a manner more private than standard email transmissions. One example is the US health care privacy regulation entitled, Health Insurance Portability and Accountability Act of 1996 (HIPAA) in the United States that provides data privacy and security provisions for safeguarding medical information. Another example is the European General Data Protection Regulation (GDPR) which includes provisions for email privacy compliance. GDPR defines what is to be achieved with compliance rather than how the requirements should be fulfilled. Consequently, it does not state a requirement to use a specific method of encrypting email, but it does require the handler of consumer non-public and personal information to maintain not only privacy of that information, but also the ability to demonstrate compliance with the privacy requirements. These requirements are discussed detail in GDPR Article 5 Clause 1(f) and 2, and Article 32 Clause 1(a) and 1(d) which focus on the requirement to protect personal data during transmission with the ability to demonstrate fact of protection of personal data.

While a normal email and electronic message system user knows how to send, receive, read, reply-to, and forward an electronic message (email refers to any electronic message transmitted using electronic message transmission protocols), a normal email user neither knows how to transmit an email in a more secure or private manner, nor knows how to verify if a message is to be sent or was sent using a more secure or private manner as compared to a standard email. Upon receiving an email, a normal email user would not know how to verify if that email was received using a secure transmission or encrypted transmission. A normal email user will not know how to prevent a recipient in receipt of the content of their sent secure transmission, to prevent them from replying insecurely and exposing their originally sent content that may be in the email thread.

More advanced email users may configure their email program to automatically filter email to be placed in certain folders, or mark email with various levels of importance. Even more advanced email users may set up systems to transmit email in a more private manner than in a standard email transmission; a standard email transmission being defined as an electronic message transmission sent using electronic messaging protocols such as SMTP, ESMTP, SMS, SMPP, MMS, HTTP, HTTPS, and combinations such as with SSL, TLS, and others.

Some of these email users or their email operator may install third party programs or encryption keys inside their existing email program to assist them in dealing with the various known and common security threats associated with email. Users (senders of email and/or recipients) or email system administrators may add software or enable settings at the email server, email gateway, or email user interface (commonly referred to as "Email Client"). These add-on software programs may add options to transmit messages in a more private manner that using standard messaging protocols. Some user may opt to upload their message to a secure server that would send a link to retrieve or view the message, and some may opt to compose their message in a secure program accessed securely in a web browser and then transmit. Some systems may send using secure application programming interfaces including protocols such as SOAP, REST, EDI exchange protocols, among others.

There are a variety of methods of transmitting messages in a more private manner than using standard email transmission protocols. Some of these methods use PGP, PKI, AES 256-Bit PDF, Link-Retrieval, HTML Wrappers, etc. with or without sending with a secure connection like TLS, SSL, or HTTPS. There are other protocols in secure messaging systems including EDI, SMS, MMS, etc. This discussion focuses on certain types of email system implementation, but the problems and the application of the invention is not limited to those.

Some common methods of encrypting transmission of electronic messages are summarized as follows:

A. PKI: Exchange of public encryption keys generated by sender and receiver digital certificates, shared between sender and receiver prior to sending messages. These "keys" are often stored in the Microsoft Outlook program. Use generally requires sender and reviver to have an advanced email program such as Microsoft Outlook full desktop installation or Lotus Notes; generally, not Gmail, Outlook.com, or web email programs.

B. PGP: Exchange of keys generated by sender and receiver. Generally, sender and receiver need email programs that are configured to manage the key exchange, or sophistication among users to deal with this type of encryption. Some services attempt to make this easier to use.

C. PDF: AES 128-bit or 256-bit PDF encryption, where the message is printed into PDF format, the attachments are embedded in their native format, and the PDF serves as an encrypted wrapper for the message body and all attachments. The encrypted PDF file is attached to the email delivered to the recipient, and the message remains encrypted inside the recipient inbox while it is in the encrypted PDF file attachment.

D. TLS: Transport layer security, connecting from sender server to recipient server via a secure encrypted transmission. This only secures the message to the recipient server and requires recipient servers to be configured to operate with this option (which is not ubiquitous or certain). Further, there are various iterations of TLS, starting with the predecessor protocol Secure Sockets Layer (SSL), TLS 1.0, TLS 1.1, TLS 1.2, and TLS 1.3, and higher.

E. Link Retrieval: Store and forward systems where the sender sends an email, it is stored at an intermediate server and that intermediate server sends an email with a link to retrieve the message; the link often includes a request for the recipient to sign-up for an account, go through several required steps, all needed to view and download the sent message. This requires storage of the message by third parties while waiting for the recipient to download and go through the steps to retrieve.

F. HTML Wrapper: The sender sends an email, it is stored at an intermediate server and that intermediate server sends an email with an HTML file attached, the HTML file being large as it contains the message and all attachments encrypted. When a recipient clicks on the HTML file, it often brings the recipient to a webpage to sign-up for an account. After going through several required steps, the message is transmitted back from the recipient (from the HTML Wrapper file) to the sending server (or intermediate server), and then displayed in a browser from the sending server (or intermediate server), for the recipient to view and download the originally sent message.

G. File Sharing: Systems that require the user/sender to upload a document to an online storage area, and then invite a recipient to have access to the online folder to view and download the file often with a required recipient password or account access.

The above methods of transmitting an electronic message in a more secure manner than a standard email message is a short summary of a variety of methods used and is not intended to be an exhaustive description of any one protocol or method, and there are others that may be used.

With heightened awareness of information privacy breaches, and government concern for protecting sensitive non-public consumer information, regulators have created data privacy regulations that require senders or sending organizations to use methods of transmission that protect the transmitted information from inadvertent disclosure to unintended recipients, eavesdroppers, or Internet thieves.

While these regulations generally do not specify a specific method of delivery, they generally do speak to the need to use methods to ensure privacy of transmitted information, and some, to maintain audit-ready records to demonstrate methods were used to ensure privacy of transmitted information.

One of the main Federal data privacy regulations in the United States is HIPAA. In Europe, the General Data Protection Regulation (GDPR), Regulation ((EU) 2016/679) goes further, emphasizing the importance of maintaining a record of 'proof of data privacy compliance'; better yet, automated, demonstrable proof on a message by message basis (as described in GDPR Article 5 Clause 1 & 2 and Article 32 Clause 1) as accountability is an important requirement of the GDPR directive. There is a trend of US state regulators and lawmakers in other countries outside of Europe adopting new privacy regulations modeled on Europe's GDPR regulations.

Due to regulations, more and more, businesses dealing with consumer information will be compelled not only to transmit information securely, but also to retain auditable proof of compliant, secure email delivery. For many businesses, new requirements will require them to change email encryption services altogether. Auditable proof of encryption compliance will be needed to deal with compliance audits and the potential of accusations of data breach; particularly when the fines prove to be as steep as the regulators have declared they will be.

Due to heighted sophistication of internet eavesdroppers and internet criminals, in their abilities to micro-target users or companies, businesses dealing with non-public strategic or regulated private (health-related or financial) will be compelled not only to transmit information securely, but also to retain visibility and tracking to verify whether systems designed to transmit information more securely did in fact transmit the message as a secure email delivery; and maintain auditable proof of compliant secure delivery. Users will desire to have visibility as to fact of encrypted delivery, receipt, or redaction of important content, as will compliance officers and system administrators. For many businesses, new requirements will require them to change email encryption services altogether. Auditable proof of encryption compliance will be needed to deal with compliance audits and the potential of accusations of data breach; particularly when the fines prove to be as steep as the regulators have declared they will be.

The main industries that will be targeted are those dealing with third-party consumer financial or health information—broadly speaking, those businesses dealing in consumer health care and financial services (banking, lending, investment advisory, insurance, residential real estate, etc.), and in functional business areas, such as, human resources, finance, accounting, and customer service. Additionally, lawyers should be interested in the functionality of the redaction of content from the email reply, as it will protect from exposure of sensitive information and they generally are familiar with the term "redaction" from use redacting content in documents.

In particular, parts of GDPR emphasize the importance of maintaining records of encrypted delivery: Article 5 for security, confidentiality, and accountability, and Article 32 for encrypting and assessing the effectiveness of technical measures to ensure securing.

Article 5 Clause 1(f) calls for maintaining the confidentiality of personal data, stating, "personal data shall be processed in a manner that ensures appropriate security of the personal data . . . using appropriate technical or organizational measures ('integrity and confidentiality')". Article 5 Clause 2 creates the need to maintain demonstrable proof of compliance with the confidential treatment of personal data, stating, "The controller shall be responsible for, and be able to demonstrate compliance with, paragraph 1 ('accountability')".

Article 32 Clause 1(a) specifies use of encryption to secure personal data, stating, "the controller and the processor shall implement appropriate technical and organizational measures to ensure a level of security appropriate to the risk, including inter alia as appropriate: (a) the pseudonymisation and encryption of personal data". Article 32 Clause 1(d) calls for regular assessments to ensure the security of the processing, stating, "a process for regularly testing, assessing and evaluating the effectiveness of technical and organizational measures for ensuring the security of the processing."

There are many concerns one needs to consider in terms of protecting the privacy of transmitted electronic information:

A. Protect from Interception—protect the message in transit across the Internet, regardless of server, provider, or settings, at the recipient. This should also protect against common interception tactics that defeat standard TLS server sending, such as TLS Downgrade Attacks that are most successful when there is no built-in fall back to another encrypted delivery method if the recipient server always or intermittently reports that it cannot accept a TLS transmission.

B. Protect from Eavesdroppers—option to protect the message as it transfers from sender through sender organization and as it transfers through to the recipient destination. There are different categories of eavesdroppers—it could be curious staff inside a sender or receiver organization, Internet criminals, or practices of an outsourced provider that has access to email. In the latter example, consider if a recipient uses Gmail, and the sender's message is encrypted to the receiver's email provider (Gmail in this case). In this example, the receiver's provider offers a free email service known to rely on marketing user information. The message content at the receiver will be analyzed by Google, with elements recorded, and a profile sold in the point of "improving" the service (aka the marketing profile of sender and/or recipient based on content of the email associated with the email addresses and other data collected).

C. Protect from Socially Engineered Leaks—a data protection plan should also consider how to protect from an imposter email received by human resources, finance, or other staff that deal in customer sensitive information, which lures them into replying with sensitive data attached. A common tactic is for an Internet criminal to pretend that they are an employee asking for benefits or tax information, by email to the human resource department, and the reply email is configured so the staff's reply with the information, unknowingly routes to the internet criminal. The technology industry calls this a "whaling" attack—a more socially engineered approach to "spear-phishing". The Federal Bureau of Investigation calls this a type of Business Email Compromise attack. The best solutions will detect for this type of socially engineered data leak.

D. Automated Rules—some may prefer the option for a sender to direct the server to encrypt a message using content added to the message before sending, such as a key word in the subject field, or based on matches of content in the message to content policies added at the server. This may be useful in certain situations.

And social elements of these means of transmitting information privately must also be considered:

A. Simple Enough that it is Used—if the service is too complicated for the sender, the sender may ultimately not use the service. If the sender, for example, needs to engage in an encryption key or certificate exchange with the intended recipient, service use will be dramatically limited. Simplicity of use is essential in today's business environment.

B. Simple for Recipient, Avoids Complaints—if the service is cumbersome for the recipient, for example, mandating numerous steps to set up an account to retrieve messages, the receiver will naturally complain to the sender or may never pick up the sender's important message. This becomes critical when the sender is sending private information where they also need proof of delivery, for example information related to a customer account, investment risk disclosures, etc. In these cases, uploading to a portal or sending a link with a complex process to retrieve will not likely deliver the information to the recipient, and may not constitute successful compliance with delivery or notification requirements.

C. Peace of Mind—providing the sender with proof of delivery, proof of fact of encrypted delivery; and providing the recipient with visible markings of fact that the sender elected to treat the information as sensitive and transmit it securely to the recipient. Simple use of TLS, for example, does neither of these.

D. No Storage—most companies prefer there not to be another location where messages are stored in transit as this creates another risk where the message may be breached. The intermediate storage server security should be monitored, and it creates a potential point for subsequent data access depending on the intermediate server's data retention and deletion techniques. For example, if one uses a file sharing service to transmit a sensitive document, users rarely return to delete the document after transmission. The document remains accessible at the shared link for an extended period. Also, link-retrieval secure e-delivery systems often store a copy on an intermediate server until the document is retrieved (and it may never be), for extended periods of time, or even if retrieved, may not have optimal deletion processes. These can unnecessarily expose sensitive data.

E. User Carelessness—protect from recipients replying to received sensitive information that they reply to leaving the sensitive data in the email thread with the reply transmitted insecurely or without the level of security the sender would have desired for that type of message or message content part.

Considering transmitting messages in a more secure manner, if doing so for compliance reasons (compliance with data privacy rules), one should consider how they may be able to maintain records of fact of encrypted delivery; how the sender may maintain audit-ready data privacy compliance proof. The General Data Protection Regulation (GDPR), Regulation ((EU) 2016/679), for example, calls for penalties of up to 4% of global turnover with a maximum of fine of 20 million Euros. Considering the potential of a fine tied to a percentage of global turnover, compliance consultants should educate their clients on the importance of maintaining a record of 'proof of data privacy compliance'; better yet, automated, demonstrable proof on a message by message basis (as described in GDPR Article 5 Clause 1 & 2 and Article 32 Clause 1) as accountability is a key requirement of the GDPR directive. US and other state and country regulators are likely to follow these guidelines in the future. Industry groups are likely to develop industry best practices for secure data transport and proof of.

With the significance of GDPR fines for a data breach, it is imperative that the sender organization has audit-ready proof of fact of encrypted delivery, on a message by message basis. Simply having a "policy" in place does not mean the policy was functioning properly. For example, a policy may automate the transmission by TLS, but that does not mean that the message went by TLS (consider a TLS Downgrade Attack). It does not mean the server was functioning properly if looked back upon months or years later, when a dispute or breach is being investigated. Audit-ready evidence on a message-by-message basis is most desirable, and preferably if this is easily demonstrated in a compliance review, compliance audit, or in case there is an accusation of a data breach by a sender (which can happen if there is a data breach at the recipient's system or after a receiver forwards a message onward).

Many companies rely on TLS delivery to secure transmission, however, many companies and email service providers do not, or use what is considered an insecure version of TLS (i.e. TLS 1.0). As Microsoft reports in their Jan. 14, 2019 blog, "as of Oct. 31, 2018, Office 365 will no longer support TLS 1.0 and 1.1," and that it "will not fix new issues that are found in clients, devices, or services that connect to Office 365 by using TLS 1.0 and 1.1." However, it stated that it will continue to deliver to recipients with these levels of TLS. See, http://docs.microsoft.com/en-us/office365/securitycompliance/technical-reference-details-about-encryption#TLS11and12deprecation."

Microsoft reports on Aug. 16, 2018, "Insights point to connectors to help draw your attention to potential TLS encryption problems for the connector. The insights are: No TLS is over 25% or TLS 1.0 is above 50%. If you see these insights, you need to investigate your email servers that are associated with the connector, or reach out to your partner organization." https://docs.microsoft.com/en-us/office365/securitycompliance/mfi-outbound-and-inbound-mail-flow (Mar. 6, 2019).

Microsoft, in Aug. 6, 2019, discussed results determined from using its Outbound and Inbound mail flow widget. Applying the widget to an exemplary company, the widget reported that 8458 outbound and 6292 inbound messages were protected by TLS 1.2 or higher. Microsoft utilized data such as this to support its support deprecation for TLS 1.0 and 1.1.

RPost blog written by Zafar Khan discusses this Dec. 7, 2018, entitled, "Not All TLS is Created Equal" (https://www.rpost.com/news/not-tls-created-equal/) citing statistics from the Google Email Transparency Report data (https://transparencyreport.google.com/safer-email/overview?hl=en) with similar conclusions to the Microsoft Insights.

Google summarizes a description of TLS encryption and its problems as: "When an email is encrypted in transit with a security protocol called transport-layer security (TLS), it is harder for others to read what you're sending. A growing number of email providers are working to encrypt email messages in transit. The data here shows the current state of email encryption in transit. Many email providers don't encrypt messages while they're in transit. When you send or receive emails with one of these providers, your messages are as open to snoopers as a postcard in the mail. A growing number of email providers are working to change that by encrypting messages sent to and from their services using Transport Layer Security (TLS). Generally speaking, use of encryption in transit continues to increase over time, as more providers enable and maintain their support. Factors such as varying volumes of email may explain other fluctuations in these encryption statistics." See, https://transparencyreport.google.com/safer-email/overview?hl=en (Mar. 6, 2019)

How encryption works:

If you mail a letter to your friend, you're hoping that she'll be the only person who reads it. But a lot could happen to that letter on its way from you to her, and there may be prying eyes who try to read it. That's why we send important messages in sealed envelopes rather than on the back of postcards. Sending and receiving email works in a similar way. But when you send or receive messages with an email provider who doesn't transmit messages via a secure connection, your emails could be open to snooping.

Transport Layer Security (TLS)

Encryption with Transport Layer Security keeps prying eyes away from your messages while they're in transit. TLS is a protocol that encrypts and delivers mail securely, for both inbound and outbound mail traffic. It helps prevent eavesdropping between mail servers—keeping your messages private while they're moving between email providers. TLS is being adopted as the standard for secure email.

Encryption depends on everyone

Your messages are encrypted only if you and the people with whom you you exchange email both use email providers that support Transport Layer Security. Not every email provider uses TLS, and if you send or receive messages from a provider that doesn't, your message could be read by eavesdroppers. While TLS isn't a perfect solution, if everyone uses it, snooping on email will be more difficult and costly than it is today.

Like Microsoft reports, Google tracks aggregate statistics for all messages inbound and outbound traffic on their hosted email offerings (i.e. Microsoft Office 365, Google Gmail, and Google G-Suite). For example, Google reported that 92% of the inbound and outbound traffic it handled was encrypted during the period of Dec. 6, 2019 to Mar. 6, 2019. Further, Microsoft and Google provide the ability to track the encryption of inbound and outbound messages in aggregate per domain.

Many, many software service sales professionals use security phrases to make cyber security sound simple. Today, as technologies advance and threats get ever more sophisticated, encrypting email for privacy compliance is not getting simpler. The hacker pays attention to the details.

Here, we will try to (in a simple manner) decipher a commonly referred to catch all for security, TLS, and explain why the details are important. "Not all TLS is created equal. Not all email one thinks is going by TLS, in fact is transmitted securely," remarks Steve Anderson, an insurance technology expert & LinkedIn influencer with more than 330 thousand followers.

First, what is TLS? TLS stands for transport layer security. This is a means, in short, of encrypting communications between two participating devices. This is mainly used when you communicate from your web browser to a web server. It's simple for the browser to display "insecure" connections, pop-up warnings, or disable a page display.

But, with email, there are more challenges. If you log-in to Gmail via your Chrome browser, the connection from your device to the Google email server is secured this way. But what about the email after you hit send, when it leaves Google's Gmail server onward to the recipient? This is where "Opportunistic TLS" may or may not be used. It is used with many major email providers (Microsoft Hosted Exchange Office 365, Gmail, etc.) by default.

Let's first remind ourselves of the most important part of email for MOST users that it gets to the intended recipient. Traditionally, whether it seen "only" by that recipient has been an afterthought.

Enter Opportunistic TLS. Here, the sending server, Gmail in this example, tries to send first with a secure TLS email transmission (SMTP) if the "opportunity" presents itself, and second, if it cannot send securely, it reverts to less secure or insecure transmission, automatic, and invisibly.

Sounds pretty good; everyone receiving email surely has the same mindset, and will accept email from Gmail through a secure connection, right? Wrong.

According to the Gmail transparency report, continuously updated as of today, 88 to 91% of inbound and outbound email to and from Gmail are sent using TLS. This means, typically, more than 10% is sent and received without any security. So, 1 in 10 messages you may send or receive via Gmail simply go out without any security. This is likely similar with Office 365 hosted email.

You might think, well, 1 in 10 insecure isn't bad. However, consider it could be far worse. According to the above report, for many recipient email domains, like Charter.net in the USA, Bigpond in Australia, Videotron via Bell in Canada; email to and from these domains to Gmail are never encrypted (0%) and with companies like Amazon, 57% are secured. What about the gazillion smaller companies out there? Do they have better security than Amazon? (Data reported by Google in its Transparency report as of December 2018)

Here is a fallacy. None of these transparency reports make the distinction which of the many TLS connections are considered insecure TLS. Generally, there are versions of with varying security; TLS 1.0, TLS 1.1, TLS 1.2, and now TLS 1.3.

Focusing on TLS 1.0, there are known risks. In particular, a TLS downgrade attack. In short, a hacker can intercept the TLS 1.0 check preceding the server to server communication to trick the sending server into sending the message in an insecure manner. Security professionals have been trying to get IT administrators to upgrade from TLS 1.0 for more than a decade; but use of this still persists, en masse; and typically accounts for more than 15% of all TLS email connections. So, maybe you are at 10% sent insecure (no TLS) plus 15% sent with a version of TLS with known security issues. Now you have an issue with 25% of your email (1 in 4 emails), at the very least. If you communicate with customers in smaller companies, individuals, the percentage is likely higher. The problem is, what to do?

Microsoft states in a 2018 blog post, while they will no longer support TLS 1.0, "this does not mean Office 365 will block TLS 1.0 and 1.1 connections. There is no official date for disabling or removing TLS 1.0 and 1.1 in the TLS service for customer [email] connections." And, remember, TLS 1.0 is known as not compliant in some circles (i.e. PCI financial compliance standard). What about for HIPAA? PII? NPI? GDPR privacy compliance? If there are known vulnerabilities with TLS 1.0, one would believe they may not be considered a "privacy compliant" means of transmission. Time will tell.

The bottom line is that Microsoft Office 365, G-suite, and other "Opportunistic TLS" systems likely send at least 25% of email with no security or in an insecure, less than a (privacy) compliant manner. There is no easy fix for these systems, as their option (as Microsoft points out as not desirable) would be to not deliver the email at all; which would cause chaos for senders and receivers. It appears, from their blog post, they prefer to deliver insecure rather than not at all.

What to do: Opportunistic TLS with Auto-Fallback

What has been needed is an Add on to Gmail, Office 365, Zimbra, or any email, a simple to use service that, if no TLS is available, or an insecure version of TLS is in place, the communication automatically reverts to an alternative method of email transmission encryption; dynamically and without bothering or burdening sender or receiver.

Figure 3:
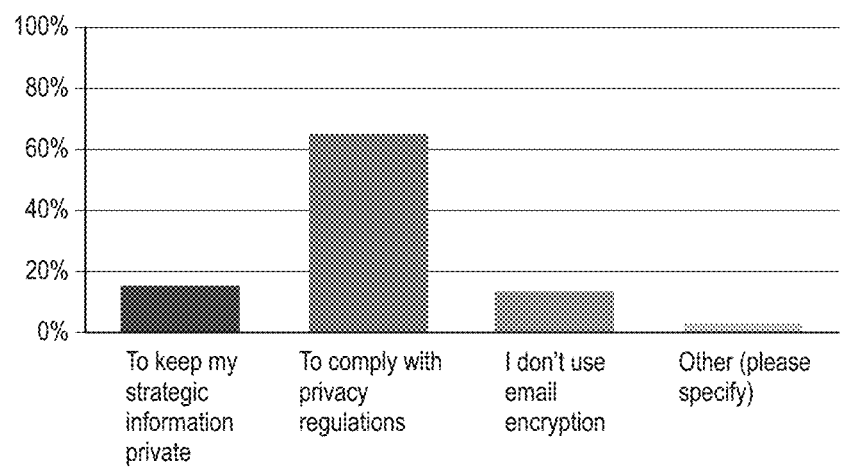
FIG. 3 is a graphical representation of results of a survey question asking why a customer uses email encryption.

The importance of third-party verifiable evidence protects the sender organization, in particular if the recipient claims a data breach occurred. As shown in FIG. 3 a 2017-2018 RPost survey conducted by Khan with an audience of RPost service subscribers, the majority of users were using email encryption for privacy compliance reasons.

Figure 4:
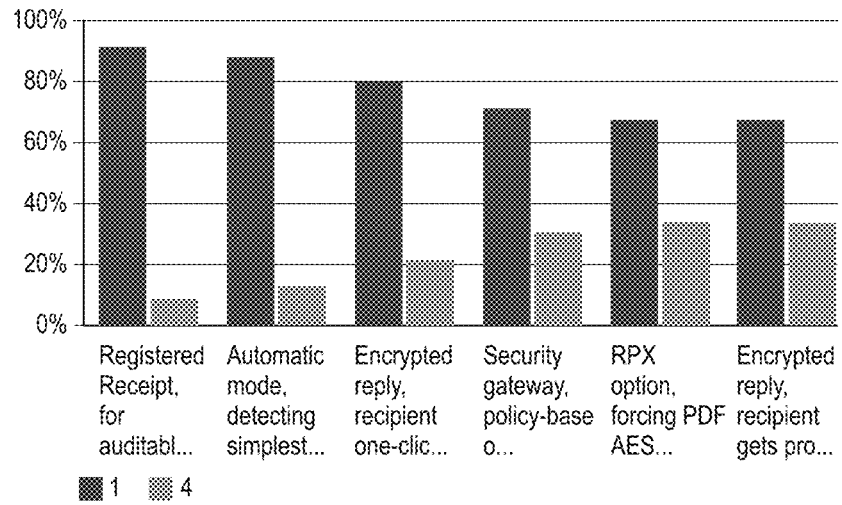
FIG. 4 is a graphical representation of results of a survey questing asking a customer to rank the importance of features in an email encryption service.

One of the most important features, according to survey respondents, as illustrated by the graph shown in FIG. 4, is a receipt that provides proof of delivery and privacy compliance. The RPost system receipt provides a receipt with proof of delivery. The RPost system receipt also indicates a message has been opted to have been sent with a particular encryption service. The RPost system receipt includes a portion of the server transmission history associated with the particular transmission.

If the sender organization generates meaningful worldwide revenue, and the regulator provides "whistleblower" rewards as a percentage of fines for data breaches, the sender must retain easy-to-demonstrate third party evidence that any claim of a breach must have occurred after the message was received securely at the recipient's system (or after they forwarded it on). It is preferable to have a record on a message by message basis that can authenticate that content was successfully delivered encrypted and that can provide proof to mitigate risk of accusations of a data breach. This may minimize the sending organization from being targeted.

For purposes of explanation, specific nomenclature is set forth to provide a thorough understanding of the present disclosure. Description of specific applications and methods are provided only as examples. Various modifications to the embodiments will be readily apparent to those skilled in the art and the general principles defined herein may be applied to other embodiments and applications without departing from the spirit and scope of the disclosure. Thus the present disclosure is not intended to be limited to the embodiments shown, but is to be accorded the widest scope consistent with the principles and steps disclosed herein.

In the following description, numerous specific details are set forth in order to provide a thorough understanding of the present disclosure. It will be apparent, however, to one of ordinary skill in the art, that the present disclosure may be practiced without these specific details. In other instances, well known components or methods have not been described in detail but rather in a block diagram, or a schematic, in order to avoid unnecessarily obscuring the present disclosure. Further specific numeric references such as "first driver," may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present disclosure. The term "coupled" is defined as meaning connected either directly to the component or indirectly to the component through another component.

Throughout the description reference will be made to various software programs and hardware components that provide and carryout the features and functions of the various embodiments of the present disclosure. Software programs may be embedded onto a machine-readable medium. A machine-readable medium includes any mechanism that provides, stores or transmits information in a form readable by a machine, such as, for example, a computer, server or other such device. For example, a machine-readable medium includes read only memory (ROM); random access memory (RAM); magnetic disk storage media; optical storage media; flash memory devices; digital video disc (DVD); EPROMs; EEPROMs; flash memory; magnetic or optical cards; or any type of media suitable for storing electronic instructions.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, do not refer to the action and processes of a general purpose computer system, or similar electronic computing device. Rather, in the context of the below description, such terms relate to processes carried out by a computer or similar electronic computing device that manipulates and transforms data represented as physical (electronic) quantities within the computer system's registers and memories into other data similarly represented as physical quantities within the computer system memories or registers, or other such information storage, transmission or display devices, under the control of embedded or software programming commands specifically designed to carry out the specific functions of the various embodiments of the disclosure.

In an embodiment, the logic consists of electronic circuits that follow the rules of Boolean Logic, software that contain patterns of instructions, or any combination of both.

The term "server" is used throughout the following description. Those skilled in the art understand that a server is a computer program that provides services to other computer programs running on the same computer or processor as the server application is running, and/or other computers or processors different from the computer or processor on which the server is running. Often, the computer or processor on which the server program is running is referred to as the server, although other programs and applications may also be running on the same computer or processor. It will be understood that a server forms part of the server/client model. As such, the processor running the server program may also be a client, requesting services from other programs, and also operate as a server to provide services to other programs upon request. It is understood that the computer or processor upon which a server program is running may access other resources, such as memory, storage media, input/output devices, communication modules and the like.

Similarly, a cloud server is a server that provides shared services to various clients that access the cloud server through a network, such as a local area network and the Internet. In a cloud based system, the server is remote from the clients, and various clients share the resources of the cloud server. Information is passed to the server by the client, and returned back to the client through the network, usually the Internet.

FIG. 1 illustrates an exemplary computer system 10 which may be used with some embodiments of the present invention, which may be, for example, a server or a client computer system. Computer system 10 may take any suitable form, including but not limited to, an embedded computer system, a system-on-chip (SOC), a single-board computer system (SBC) (such as, for example, a computer-on-module (COM) or system-on-module (SOM)), a laptop or notebook computer system, a smart phone, a personal digital assistant (PDA), a server, a tablet computer system, a kiosk, a terminal, a mainframe, a mesh of computer systems, etc. Computer system 10 may be a combination of multiple forms. Computer system 500 may include one or more computer systems 10, be unitary or distributed, span multiple locations, span multiple systems, or reside in a cloud (which may include one or more cloud components in one or more networks).

In one embodiment, computer system 10 may include one or more processors 11, memory 12, storage 13, an input/output (I/O) interface 14, a communication interface 15, and a bus 16. Although this disclosure describes and illustrates a particular computer system having a particular number of particular components in a particular arrangement, this disclosure contemplates other forms of computer systems having any suitable number of components in any suitable arrangement.

In one embodiment, processor 11 includes hardware for executing instructions, such as those making up software. Herein, reference to software may encompass one or more applications, byte code, one or more computer programs, one or more executable module or API, one or more instructions, logic, machine code, one or more scripts, or source code, and or the like, where appropriate. As an example and not by way of limitation, to execute instructions, processor 11 may retrieve the instructions from an internal register, an internal cache, memory 12 or storage 13; decode and execute them; and then write one or more results to an internal register, an internal cache, memory 12, or storage 13. In one embodiment, processor 11 may include one or more internal caches for data, instructions, or addresses. Memory 13 may be random access memory (RAM), static RAM, dynamic RAM or any other suitable memory. Storage 15 may be a hard drive, a floppy disk drive, flash memory, an optical disk, magnetic tape, or any other form of storage device that can store data (including instructions for execution by a processor).

In one embodiment, storage 13 may be mass storage for data or instructions which may include, but not limited to, a HDD, solid state drive, disk drive, flash memory, optical disc (such as a DVD, CD, Blu-ray, and the like), magneto optical disc, magnetic tape, or any other hardware device which stores computer readable media, data and/or combinations thereof. Storage 13 maybe be internal or external to computer system 10.

In one embodiment, input/output (I/O) interface 304 includes hardware, software, or both for providing one or more interfaces for communication between computer system 10 and one or more I/O devices. Computer system 10 may have one or more of these I/O devices, where appropriate. As an example but not by way of limitation, an I/O device may include one or more mouses, keyboards, keypads, cameras, microphones, monitors, displays, printers, scanners, speakers, cameras, touch screens, trackball, trackpad, biometric input device or sensor, or the like.

In still another embodiment, a communication interface 15 includes hardware, software, or both providing one or more interfaces for communication between one or more computer systems or one or more networks. Communication interface 15 may include a network interface controller (NIC) or a network adapter for communicating with an Ethernet or other wired-based network or a wireless NIC or wireless adapter for communications with a wireless network, such as a Wi-Fi network. In one embodiment, bus 16 includes any hardware, software, or both, coupling components of a computer system 10 to each other.

Figure 2:
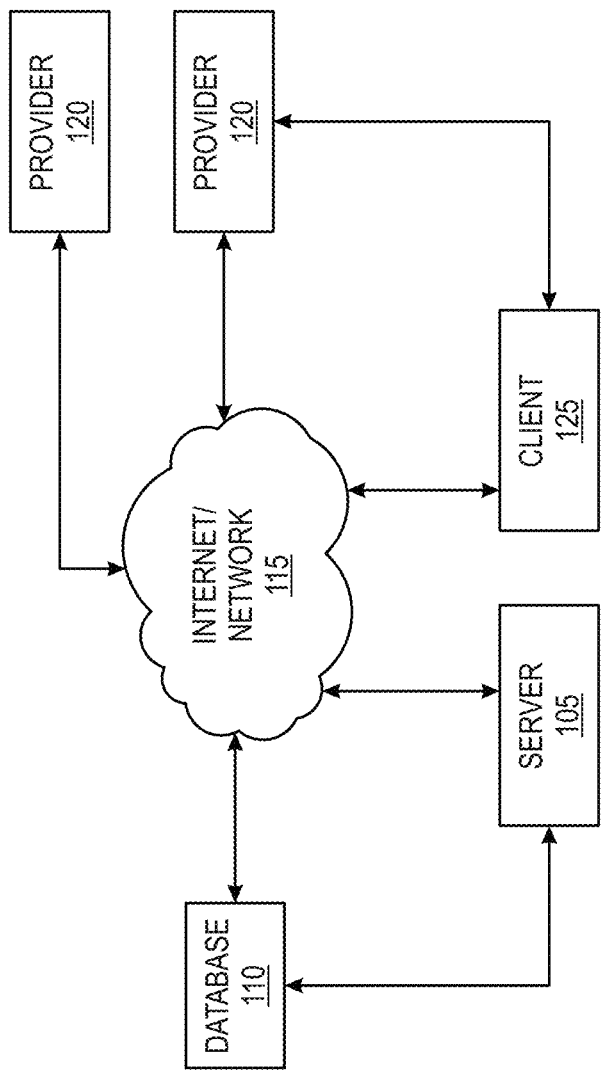
FIG. 2 is a schematic diagram of a network used in accordance with the various embodiments of the disclosure.

FIG. 2 is a graphical representation of an exemplary network 100 that may be used to facilitate the various embodiments of the present invention. Server 105 is operated by a services organization, and typically includes at least one processor, input and output equipment or devices, memory, storage, and a communication interface as discussed above with regards to FIG. 1. The server also operates under the control of specialized software programming commands that are designed to carry out the various processes described above. It should be understood that while the exemplary network 100 is described in terms of a server operated by a services organization, the server could be operated by a third party hired by the services organization or under the control of the services organization. The server could also be operated by a third party independent of the services organization, which then provides information and/or data to the services organization from which the services organization may provide services to a client of the services organization.

A data storage device 110, which may be separate from the server, but not necessarily, may be accessible to the server 105, and may be used for storing date related to information and any other data related to operation of the various embodiments of the system and method described above. The data storage device 110 may directly connected to the server, or it may be accessible to the server through a network or the Internet 115, The data storage device may also be a virtual storage device or memory located in the Cloud. Also connected through the network or the Internet 115 are one or more providers 120 or a client 125.

From the above, while it may be apparent that the various embodiments disclosed herein may be implemented by computers, servers or other processors that appear to be organized in a conventional distributed processing system architecture, the various embodiments disclosed herein are not conventional, because they bridge multiple remote information sources, such as legacy computer applications, legacy storage media and data resident on workstation storage, media, and also involve sophisticated analysis of various parts of an email message, as well as the methods, protocols, and communication pathways used to transmit and receive the email message. In fact, when the various embodiments of this disclosure are operated using computers, servers, and processors, those embodiments transform those computers, servers, and processors into specially programmed computer, servers, and processor in a way that improves not only the operation of the various hardware and software components of the system, but also significantly improve the transmission, receipt, and processing of email messages.

For the purposes of the invention, there are technologies known by those skilled in the art and the methods of implementing the invention will use technology components commonly used by those skilled in the art, and this description of the invention therefore does not describe these component technologies. These include use of:

1. Sender mail client
2. Sender mail server
3. Sender mail gateway
4. Email content filtering
5. Secure messaging service servers
6. Secure transmission protocols
7. Email encryption methods and protocols
8. Database logging and association
9. RPost Registered Email service technology (patented)
10. RPost Registered Receipt authentication service technology (patented)
11. Hashing, Digital Signature, and Block Chain technologies
12. RPost SideNote service technology (patented)
13. Recipient mail gateways
14. Recipient mail servers
15. Recipient mail clients such as Microsoft Outlook or Gmail
16. Parts of a message
    a. Message headers
    b. Message content
17. Message transmission protocols including secure message transmission protocols
18. Data reports provided by email
19. Web views of data reports
20. Encryption and authentication processes and protocols
21. Replies to received electronic messages
22. Use of software tools to extract content and create images of the content
23. Use of tools to create content that may be associated with HTML links, and self-extracting HTML links inserted into email
24. Associating information in databases
25. Operating software on web and email servers The term "email" used herein may refer to any electronic message type; the term "email protocol" may refer to any electronic data exchange protocol, and the term "electronic file" may refer to any file type.

The various embodiments described herein may be implemented as a whole, or only in select parts. For the purpose of this disclosure, consider implementing for each part, in one embodiment, of which there are others that a skilled practitioner would identify as within the spirit of the invention.

A. Registered Encryption

REGISTERED ENCRYPTION is a trademark of RPOST Communications Limited. Track and Prove Encrypted Message Delivery: Delivery of encrypted message with visibility and auditable proof of fact of secure delivery to the intended recipients. This builds upon the inventions described in the Tomkow U.S. Pat. No. 7,966,372 patent, which is incorporated herein in its entirety.

Recording Secure Inbound Transmission of the Message to RPost from Sender

1. Using Received Message Header Analysis at Receiving System

An embodiment of the disclosed system includes review of received message headers. In this embodiment, "RPost" refers to an intermediate server that a message from a sender is directed to on route to the recipient and the intermediate server that relays the sender's message to the recipient.

In this embodiment, the RPost system records whether or not a message arrived at one of RPost servers via TLS by recording information in the header of the message received. Since that header is in a copy of the received message, in effect systems receiving email already get information about whether the last transmission to the received server was conducted via TLS or not; if the receiving server or an individual with expertise were to examine each header at the recipient. In this embodiment, the RPost intermediate server system extracts the data that indicates the message was received by TLS from the message header in the message received from the sender at the RPost intermediate server, and parts of this message header are put in a database for later adding to a receipt record or report.

If the message that arrives at the RPost server travels through multiple servers before it arrives at the RPost server, even if the last hop (or server) to RPost was TLS, it may have been passed through non-TLS servers along the way. The whole history, including indications of whether each hop was TLS, may also be part of the message header when the message is received at the RPost intermediate server, but without this invention, there is no standard way of recording that the connection from the sender to the intermediate server was a secure TLS connection.

In one embodiment, since the information in the received message header may be written in different formats depending on each sending or relay MTA server, a list of all of all known MTA servers could be built, and if the system is not able to detect the TLS information due to placement in the header in an unknown format, the system does not record the TLS secure connection for that server. The system includes a process of, when there is an unknown header format, putting that message into an investigation queue for review and learning, or for machine learning analysis of that new message header type, to then add that type of secure connection protocol element to the list of known ones, to dynamically build and update the list.

Often, indeed typically, a message won't be sent TLS when it is being passed from an internal mail server to a perimeter gateway server—because TLS is slower to transmit than without TLS. That is not necessarily insecure, but to tell if that is what is going on one needs some way of telling that a particular transfer was internal. That can usually be figured out, but it isn't always easy or fool proof Information about last known server and the sequence of servers and the transmission protocols from the variety of servers that can be identified from the header can be analyzed with rules updated dynamically based on learnings.

In an embodiment, the system would, at least, record the last hop—from the sender's gateway to RPost having been received at the RPost intermediate server via TLS (or via another secure protocol). This may entail recording the sending gateway server name+IP address of the last hop to RPost. If encryption option has been indicated in the received message, the system may record whether the message was received Encrypted (and by which method, TLS, TLS version, or PKI for example). All the audit info required to determine if a message was received by RPost by way of TLS may be available given a human analysis but doing a meaningful automated real-time analysis may be very difficult and may require specialized and unconventional systems. Further, determining if the message was received securely via another method (i.e, PKI) but delivered without TLS would be part of the analysis.

EXAMPLE

The BOLD text being the elements of the email header on the received inbound message from sender at the RPost intermediate server that would be parsed and copied into the database at RPost.

---

Received: from abc.luxsci.com ([1.1.1.1])
    by def.luxsci.com (8.14.4/8.13.8) with ESMTP id r7JEfLgH003867
    (version=TLSv1/SSLv3 cipher=DHE-RSA-AES256-SHA bits=256
    verify=NOT)
    for <user-xyz@def.luxsci.com>; Mon, 19 Aug 2013 10:41:21 -0400
Received: from abc.luxsci.com (localhost.localdomain [127.0.0.1])
    by abc.luxsci.com (8.14.4/8.13.8) with ESMTP id r7JEfK0Z030182
    for <user-xyz@def.luxsci.com>; Mon, 19 Aug 2013 09:41:20 -0500
Received: (from mail@localhost)
    by abc.luxsci.com (8.14.4/8.13.8/Submit) id r7JEfKXD030178
    for user-xyz@def.luxsci.com; Mon, 19 Aug 2013 09:41:20 -0500

---

On the email received inbound from sender at the RPost server, there will be a series of headers in order of the last hop. (i.e. a sender to exchange server to gateway server to perimeter server service to RPost intermediate server—each may or may not have a TLS secure level of transmission and may have different TLS security protocol levels (i.e. TLS 1.0, 1.1, 1.2, 1.3). RPost server records this header, and runs a program on it to parse out at least "Last Received From Server Name/Secure by TSL (protocol level)" with the option to see the previous hops, with the analysis moot (overridden) if received message-level encrypted (i.e. PKI encrypted from sender to RPost). Sender organization can opt for level of view (last hop, all hops) with security determination on last hop only or all hops.

Since the parsing of the email headers on messages received inbound from sender at the RPost server may be processor intensive, this parsing may be done after the message moves onward in the process to the recipient.

The parsed/copied content from the headers are placed in a database and categorized based on a hierarchy of what is important for sender security (i.e. Best, Acceptable, Fail).

The message is transmitted to the recipient according to the sender secure transmission preferences.

If the message is processed for message level security, the fact of re-encrypting the message at the RPost server is recorded, associated with the message ID and method of re-encryption, timestamps, etc.

If the message is processed for secure transmission (i.e. TLS), after transmission, the SMTP/ESMTP or message transport protocol information if other protocol (i.e. HTTP) is recorded and parsed for the portions that determine fact of secure transmission from RPost to the recipient and details about the secure transmission protocol successfully used in the transmission (i.e. TLS1.2). This parsing of the protocol information occurs after transmission of the message to the recipient in this embodiment, due to the extra processing required to parse the header and other transmission data after transmission.

This protocol information is stored in a database associated with the message ID and received security transmission information.

The parsed/copied message sending protocol parts placed in a database are categorized based on a hierarchy of what is important for sender security (i.e. Best, Acceptable, Fail). For example, "Best" could mean TLS 1.2 or message level encryption (i.e. PKI). "Acceptable" could be set by the sender organization, for example, to mean TLS 1.1. "Fail" could be set by the sender organization, for example, to mean TLS 1.0 or no TLS.

The (received from sender) and (sent to recipient) categorizations are matched, with a chart to display made available to the sender and/or sender organization with the result (interpretation) and the protocol/method data, along with a sum of the security level which may be set to be the higher of the sum of the (received from sender) and (sent to recipient) levels.

Example 1. If (received from sender)=Best
(sent to recipient)=Acceptable
Result=Acceptable Example 2. If (received from sender)=Best
(sent to recipient)=Fail
Result=Fail Example 3. If (received from sender)=Acceptable
(sent to recipient)=Acceptable
Result=Acceptable Considering the above example of the database record for an email sent from Bob@company.com to Sue@network.com and Jim@home.com could be in summary, as follows, with additional fields for message ID, hash of the sent message, additional sender hops extracted from headers, and the level of secure transmission at each recorded additional hop. For the example from, Bob to Jim, receiving the message at the RPost server via RPost server public key PKI applied by RPost sender app was detected, therefore the system knows the message was sent secure from the sender Bob mail client (vs. the sender domain or server IP address) to RPost en route to Jim and would record fact of processing to decrypt via PKI at the RPost server after having received the PKI message transmission at the RPost server.

Sender to RPOST

| Origin Sender | End Recipient | Sent Secure Identifier, Last Hop | Received Secure Identifier | Time Accepted |
|---|---|---|---|---|
| Bob@company.com | Sue@network.com | FQDN Domain, IP | TLS1.2@Server 1 | 10:01:10 UTC |
| Bob@company.com | Jim@home.com | Sender + FQDN + IP | RPPKI + TLS1.0@Server 3 | 10:02:15 UTC |

If message itself is received by an HTTP protocol (via REST, SOAP or another API protocol), at the receiving RPost Message Gateway Server, identify received by HTTP protocol, and version of HTTP protocol used. Record in the database logically associated with the message which RPost Message Gateway Server accepted the message and record logically associated with the server information what the HTTP level of transmission was used.

If message itself is received by an HTTP protocol (via web server or another web transfer or messaging protocol), at the receiving RPost Message Gateway Server, identify received by HTTP protocol, and version of HTTP protocol used. Record in the database logically associated with the message which RPost Message Gateway Server accepted the message and record logically associated with the server information what the HTTP level of transmission was used.

For all of the above, include message ID, timestamp of receipt at the RPost server, and at least a portion of the message transport protocol dialog that indicates secure transmission, or a portion of the server configuration metadata that confirms server only accepts inbound message received using a certain secure transmission protocol or fact of RPost server decrypting a received PKI encrypted message at the RPost server ("Secure Transmission Forensics"); record in a database logically associated, hashed together, and/or hashed separately.

Record the Secure Transmission Forensics and optionally record in a database with a hash of the message content received.

2. Recording Secure Outbound Transmission of the Message from RPost to Recipient.

When the message is received at the RPost server, there needs to be a determination as to how the message is delivered to the intended recipient in a secure manner.

Based on the:

A. feature request of the sender (sender or sender settings determining how the message should be transmitted securely to the recipient (with what secure transmission method, system or protocol), the message is transmitted, or, B. availability at the recipient to accept a certain type of secure transmission, the message in a one of a select secure transmission protocols, the message should be transmitted securely to the recipient (with what secure transmission method, system or protocol).

In an example of one embodiment, if (A), the RPost server would transmit the message with message level encryption based on the feature set by the sender or sender admin, and the message would be transmitted encapsulated inside a 256-bit encrypted PDF file.

For another message, if (B), the RPost server would transmit the message with message level encryption based on the feature set by the sender or sender admin with the requirement of TLS 1.2 sending unless unavailable, and if unavailable, send transmitted encapsulated inside a 256-bit encrypted PDF file. For another message, if (B), the RPost server would transmit the message with message level encryption based on the feature set by the sender or sender admin with the requirement of TLS 1.0 or more secure, but if a recipient was able to accept TLS 1.2 and therefore TLS 1.2 protocol was used for the secure transmission.

The level of TLS transmission available can be kept in a cache stored at the RPost MTA or in a database, or server associated with the RPost MTA, and only if that protocol is not available, re-test to determine available protocols, and if then the desired protocol is not available, revert to an alternative message level encryption transmission (i.e. AES 256 bit PDF encryption). The fact of, type, and/or level of encryption from RPost to recipient being recorded at RPost in a database.

Figure 5:
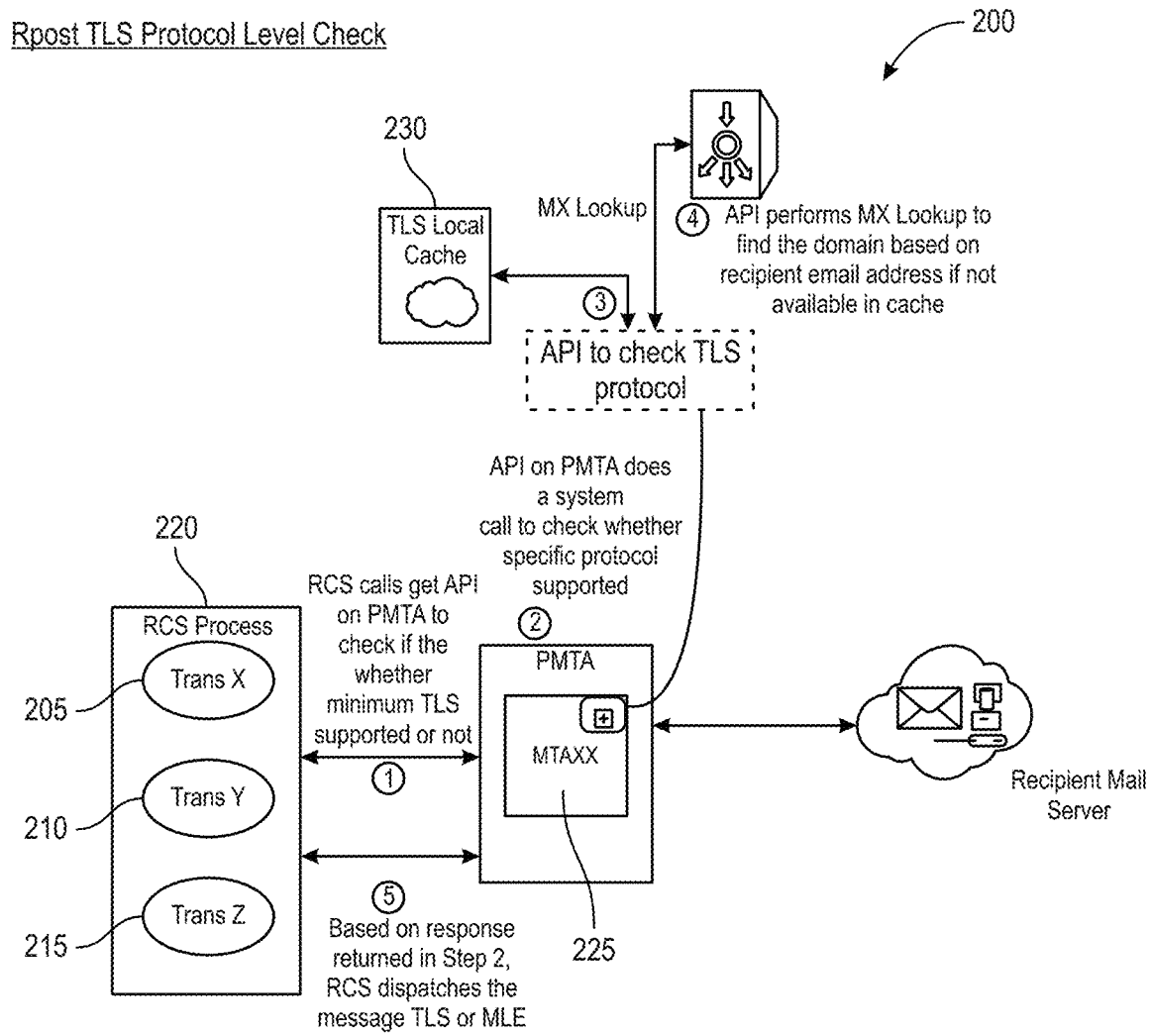
FIG. 5 is a schematic diagram of one embodiment of a process for determining an allowable encryption level that may be received by a recipient of an electronic message.

FIG. 5 illustrates an embodiment 200 of a determining what level of secure transmission protocol can be received by a particular recipient, which then determines what type or level of encryption will be used to transmit a message to a recipient of the message. In this embodiment, a message is received by a server in a Registered Central Server (RCS) 220, such as servers Trans X 205, Trans Y 210, or Trans Z 215. This example assumes Trans X 205 has received the message. The RCS server Trans X calls "get API" on an MTA (Message Transport Agent) server MTAXX in step 1. In step 2, The API performs a system call to analyze the type of protocol that exists in the message. If the result is that the message is encrypted in a particular TLS protocol, the API checks in a memory such as TLS Local Cache 230 to see if the recipient is known to the system in step 3. If the recipient is known to the server, the API communicates with RCS Server Trans X 205 and instructs the server as to the proper TLS or MLE protocol with which to transmit the message to the recipient, and Trans X then transmits the message to the recipient.

In some case, however, the recipient may not be able to receive a message using a TLS protocol. In such a case, the message will not be transmitted until an appropriate protocol that can be received by the recipient is determined. In such a case, the message will be transmitted using pdf encryptions, for example.

When setting up a customer to use the disclosed system, the customer sending the electronic message to a recipient may set a minimum supported TLS protocol for message delivery. In such an example, the customer's setting can over ride the recipient's server settings, even if the disclosed system supports the recipient's encryption protocol. In such a case, the message, if it cannot be received by the recipients encryption protocol, may then be sent to the recipient using, for example, a pdf encryption protocol.

The RPost server records which method of delivery was used for the actual transmission for each intended recipient. This is different than showing that there was a request to transmit encrypted. The distinction here is there is a record of secure transmission to each intended recipient with secure forensic metadata recorded.

Considering the above example of the database record for an email sent from Bob@company.com to Sue@network.com and Jim@home.com could be in summary, as follows, with additional fields for message ID, hash of the sent message, additional sender hops extracted from headers, and the level of secure transmission at each recorded additional hop. For the example from Bob to Jim, receiving the message at the RPost server via RPost server public key PKI applied by RPost sender app was detected, therefore the system knows the message was sent secure from the sender Bob mail client (vs. the sender domain or server IP address) to RPost in route to Jim.

RPOST to Recipient

| Origin Sender | End Recipient | Sent Secure Identifier, Last Hop | Secure Transmission to | Time Accepted |
|---|---|---|---|---|
| Bob@company.com | Sue@network.com | TLS1.2 | IP FQDN & Recipient | 10:02:10 UTC |
| Bob@company.com | Jim@home.com | PDFAES256 + TLS1.0 | Recipient Mailbox | 10:04:15 UTC |

If the recipient is not know to the system, then the API performs a MXLookup to find the domain based on the address contained in the received message in step 4. Once the domain is determined, a copy of the recipient's information is stored in TLS Local Cache 230, and instructions for use of the proper protocol for transmitting the message are communicated to server Trans X 205, and the message is transmitted using the proper encryption protocol to the recipient.

These records would combine in the database through a common message ID, and would include a hash of the entire forensic metadata, logically associated with a hash of the content, and could be generated into a "Certificate of Security" that is digitally signed, in a manner that can prove the content originally transmitted, received, timestamps of sending, dispatch, delivery, decrypting if PKI, opening, using various methods disclosed in the Tomkow family of patents and prior art.

Sender to RPOST

| Origin Sender | End Recipient | Sent Secure Identifier, Last Hop | Received Secure Identifier | Time Accepted |
|---|---|---|---|---|
| Bob@company.com | Sue@network.com | FQDN Domain, IP | TLS1.2@Server 1 | 10:01:10 UTC |

-continued

| Origin Sender | End Recipient | Sent Secure Identifier, Last Hop | Received Secure Identifier | Time Accepted |
|---|---|---|---|---|
| Bob@company.com | Jim@home.com | Sender + FQDN + IP | RPPKI + TLS1.0@Server 3 | 10:02:1 5 UTC |

RPOST to Recipient

| Origin Sender | End Recipient | Sent Secure Identifier, Last Hop | Secure Transmission to | Time Accepted |
|---|---|---|---|---|
| Bob@company.com | Sue@network.com | TLS1.2 | IP FQDN & Recipient | 10:02:10 UTC |
| Bob@company.com | Jim@home.com | PDFAES256 + TLS1.0 | Recipient Mailbox | 10:04:15 UTC |

The report could include a summary of the above using a formula or by creating a security score, for example,
If Sender to RPost=secure via PKI, 4 points
If Sender to RPost=secure TLS 1.2, 3 points
If Sender to RPost=secure TLS 1.1, 2 points
If Sender to RPost=secure TLS 1.0, 1 point
If RPost to Recipient=secure via PDF AES-256, 4 points
If RPost to Recipient=secure via TLS 1.2, 3 points
If RPost to Recipient=secure via TLS 1.1, 2 points
If RPost to Recipient=secure via TLS 1.0, 1 point
If either Sender to RPost or RPost to Recipient has zero points, then create flag to alert sender admin.

The above scores can be adjusted based on what level of security is important for the sender organization; in a management interface that additionally permits the sender administrator the ability to opt to exclude points for secure transmission for certain transmission protocols.

The "Certificate of Confidentiality" or "Certificate of Security" or "Certified Secure" record can include delivery status information, along with the portions of the message transport protocol combined with database records of certain processing having been conducted (i.e. converting message to PDF AES-256 wrapper), and provide in a prominent manner for sender and sender organization an indication that the transmission was Certified Secure to the standards the sender organization indicates is secure enough for their purposes, and optionally display the security score. This Certificate of Security can be compiled to confirm multiple communications threads, including, as an example, a submission from sending application (via SMTP, HTTP, or other protocols) to the processing hub, to the receiver, and then (in an example of an e-sign, reply or response from the receiver) back to the sender and any copied or blind copied recipients. In this example, the information of fact of secure transmission of the replies, responses, and e-sign records, or fact of message parts being redacted in the send or from the reply (as further described herein) would be recorded in a similar manner.

It is understood that the message may be transmitted to the intended recipient via HTTP or HTTPS, HTTPS being permitted and HTTP not, depending on the sender admin rules (for link-retrieval large file sending, for example). This information would similarly be captured. Additionally, the metadata would capture whether sent by HTTPS plus Recipient Password Required, or simply HTTPS.

In another embodiment of the Certificate of Security, the system will analyze the message and may include the following steps:

1. RPost system decrypts a received encrypted message sent from sender's Outlook (i.e. PKI decryption, how RPost code verifies/records that it was in fact received PKI encrypted from RPost app.).

2. RPost system records receipt of inbound message from sender SMTP via TLS (key point being how RPost code verifies/records fact of receipt at RPost system by TLS transmission from sender).

3. RPost system records receipt of inbound message from API connection (via HTTPS) (key point being how RPost code verifies/records fact of receipt by secure web services HTTPS transmission from sender) [both scenarios, in send of secure largemail or receipt of a secure reply].

4. RPost system records delivery of outbound message via TLS to recipient gateway (key point being how RPost code verifies/records fact of successful TLS transmission to recipient gateway)

5. RPost system records fact of 256-bit encrypting and password protecting PDF message prior to transmission to recipient.

The above being recorded in a database at RPost.

Each secure transmission defining element recorded in an RPost database with the record appended inside the registered receipt in a text file displayed at authentication, and with the fact of 1+4, 2+4, 3+4, or 1+5, 2+5, or 3+5 being done to provide a confirmation of encrypted transmission in the receipt.

Track and Prove Encrypted Inbound Message Receipt: Receipt of an inbound message with visibility of and auditable proof of fact of secure delivery from original sender. A recipient may also see a record that reports secure transmission from sender, with a record to verify fact of receipt of the message via a secure transmission from sender (via RPost).

A security gateway server could use the same elements noted for recording inbound message traffic in terms of analyzing the message headers to extract the TLS or message level encryption data, and place an indicator in the message header, subject or body to certify secure receiving.

B. Redacted Reply™

REDACTED REPLY is a trademark of Rpost Communication Limited.

Registered Redaction of Reply Message Part: Redacting a message part from email thread of the sender's message content upon reply by a recipient with sender's option to register fact of redaction for sender.

The methods of redacting a portion of the reply may be one of the following:

1. Designating Highly Confidential Message Part

A user interface text box in the sender mail client can be a location where the sender can add certain highly sensitive text, for example a credit card number or medical record information.

Alternatively, the sender may insert the highly sensitive information inside a certain type of bracket structure, such as ^highly sensitive content here^.

2. Transmitting Securely to the Recipient.

The problem is profound when the sender transmits the secure message to the recipient via TLS, confidently knowing they took measures to send it secure. But, to their surprise, when the recipient replies, maybe with a casual "Thanks!" comment, their highly sensitive information was returned to them (through all of the hops and servers) possibly without any security, exposing the senders highly sensitive information.

The message is transmitted to the RPost server securely (PKI, TLS, etc.) from the sender and at the RPost server, the server removes the designated highly confidential content, and either A. Creates a small image of the content and a corresponding black image of the same size, B. An Alt-Text tag name is added to the image file that is designated by the sender, associated with the sender, or default, says "Click for SENDER EMAIL ADDRESS Sensitive Content". This would need to be text that would not easily be spoofed by spammers.

C. Places the image in the designated area of the message body via a link configured to automatically extract at the recipient D. The sender can select the number of views of the sensitive content and/or time after first viewing it remains available. This is stored at the server.

E. Places the black image in a location associated with the image of the sensitive content so that after the image with the sensitive content is displayed to its limit (as noted in D), the image link is redirected to the link for the corresponding black image.

3. At the Recipient

The recipient opens the email transmitted securely by TLS, and sees the Alt-Text tag if the link does not automatically display the sensitive content. If it does not display, clicking the link or clicking to display images shows the sensitive content.

4. Upon Reply

The recipient sees the content, yet when they reply, the content is not displayed after the reply (the link has a timeout after first view, or certain time after first view and/or after sending, etc.

When the sensitive content times out, the content space is replaced with a black box that says "Redacted Content" (as noted in E above).

Additional Option.

It is expected that some senders sending to certain recipients would not want to send email with hyperlinks due to the recipient security policies preventing such from being viewable.

A setting at the sender or sender administrator can replace the secure content image from an image stored, to extracted content placed in a text box attached to the email, with the removed content replaced with black text that says "^REDACTED CONTENT ATTACHED IN TEXT FILE^. The attached file could be, in an alternative embodiment or at the option of a sender setting, a text file, HTML file, PDF, encrypted PDF, etc.

When the recipient replies, the text file does not follow the reply and therefore the goal is accomplished; preventing inadvertent disclosure of received highly sensitive information at or after reply.

Certificate of Security

An added score to the security certificate scoring would be use of this Redacted Reply system. Additionally, there can be an indication of how many times the secure image was displayed, "displaying once"="most secure", or "expired 10 minutes after first display"="most secure", or some setting that is unlikely to display a second time inadvertently.

It is important to note that this feature is to prevent inadvertent disclosure of the sender's sensitive information by the recipient when the recipient replies. It is not intended in this embodiment to prevent the recipient from forwarding, copying or taking a screen shot of the content, although additional known methods can be implemented to further control or restrict the display of the sensitive information.

Authentication of Certificate of Security

To authenticate the Certificate of Security, one could post a hash of the certificate and a hash of the message together hashed, one or the other, or both in a block chain so that if needed, the message could be rehashed and compared to the hash in the block chain so that the private message would not need to be stored by a third party or returned in a receipt.

Alternatively, a Registered Receipt system as disclosed in the Tomkow family of patents could include the forensic security metadata, the Certificate of Security and other elements including the underlying message transport protocol and system processing forensics that verify fact of message level encrypting (conversion to 256-bit AES PDF file) and or receipt and or sending by TLS and TLS level number.

If using a block chain as part of the verification, an embodiment is as follows:

There could be some value in storing a hash of the Certificate of Security ("receipt") data on the blockchain.

The receipt could be a JSON object containing all the delivery status information and message meta data along with base64 encoded strings representing the message and associated DSN, MUA, transmission protocols, server system data regarding encryption and decryption, receipts etc. The hash on the blockchain could be a canonicalized representation of the serialized JSON object.

The JSON object could be formatted as HTML through a template engine to produce the email receipt or accessed by customer systems on a real-time push basis through web hooks.

The hashes posted to the blockchain would be digitally signed by an documented RPost address. There would be no need to encrypt the receipt data as any tampering would invalidate the receipt.

Simple tools to perform the verification process through hashing the canonicalized JSON object and retrieving the transaction hash from the blockchain could be easily created in various languages (Node, Ruby, Python etc.) and posted to GitHub public repos and package managers (npm, gem, pip etc.). In addition docker containers can be posted to the docker hub.

That way corporate users (IT departments) could install and run their own verifiers with a few commands. The verifiers can then be easily incorporated into their business processes. RPost would still run verifiers in addition.

Use of block chain as a verifier means RPost would not need any key escrow and/or 3rd party guarantees for ongoing support for receipt validation as all the information to validate receipts is public and the blockchain is distributed and immutable.

The cost for a transaction would be around $0.02 per hash (not insignificant) to write to the blockchain. There is no cost to read the transactions. If this were implemented RPost would want a private blockchain for non-paying customers and testing, and only implement the public blockchain for paying users opting to pay the particular block chain's cost.

Blockchain solution may have some benefit for sales & marketing with a core value being for the service is the perpetual validity of the receipts and independent verification.

FIG. 6 is a listing of various settings available to a sender of a message using the redacted reply system. In option one, the system attaches chosen redacted reply content to the outbound message to the recipient as a text file. There is an option to select a file type for example, an HTML file, and an option to separately encrypt an attachment file if needed.

In option 2, the system inserts a link to the redacted reply text inside the email body. In one embodiment, the browser option, a new browser window is opened when the redacted reply text link is clicked or link activated with the redacted reply text displaying when the link is activated. A number of options for this step are also set forth, and will be understood that these are exemplary and not limiting. For example, when a sender chooses to have a link open a browser window with the Redacted Reply text when the link is clicked, the sender may also configure various setting to control what happens when the link is clicked. For example, the sender may configure the link so that the Redacted Reply text is locked so it cannot be copied. Alternatively, the link may be configured to allow the text to be copied. In another embodiment, the sender may add a customer logo to the browser when it opens. The number of times the Redacted Reply text may be viewed by a recipient may also be configured by the sender, using either an enterable field or a drop down list.

In still another embodiment, the sender may configure the link to limit the time Redacted Reply text may be viewed. Further, the sender may provide text that is shown in the browser windows when the link is clicked. For example, the browser window may display a message such as "The following information is private. If you are not an intended recipient of confidential and privileged information in this email, please delete it immediately. Do not disseminate this information."

In another option, the redacted content is removed and displayed as an image inside an email. The image file is stored in a temporary storage area associated with the web link, and a link is also stored. In an embodiment, the system may create a second image file of the same size that is black with white text labeled, "redacted content". The system may then add alt-text to the image file, "redacted: click to that view". In an embodiment, viewing of the image file is only permitted when the viewer is using the original IP address of the first view, and/or, only for a certain number of displays and/or only for a specified time period which may be configured by the sender.

In one embodiment, the system removes content and displays image inside email, image containing redacted content by, for example, implementing software instructions to convert the text marked for redaction to an image file; store the image file in a secure temporary storage area associated with a web link, and create a link of image file. The sender may also configure the system to create a second image file of same size (height, width) that is black with white text "Redacted Content"; Add Alt-Text to the image file such as, for example, "Redacted: Click to View"; record IP address of first view; permit viewing of image file (i) only from original IP address, and/or (ii) only for a certain number of displays and/or (iii) only for a specified time period with (i), (ii) and (iii) being configurable by sender company.

Figure 7:
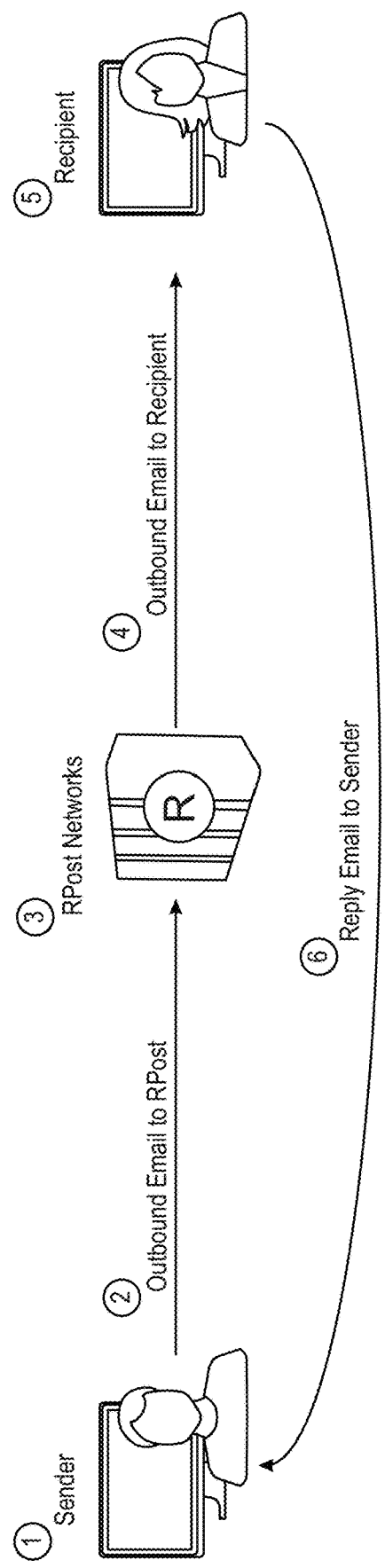
FIG. 7 is a schematic diagram of one embodiment of a system in accordance with present disclosure.

FIG. 7 illustrates a workflow for the redacted reply embodiment. A sender in box 1 originates an outbound email (box 2) sent to the RPost server in box 3. After processing at the RPost-network, an outbound email is sent from RPost in box 4 to a recipient in box 5. In such an embodiment, RPost-networks, as identified in box 3, could be software at the sender, a sender email server, a sender gateway, or an intermediate server as illustrated FIG. 7.

Figure 8:
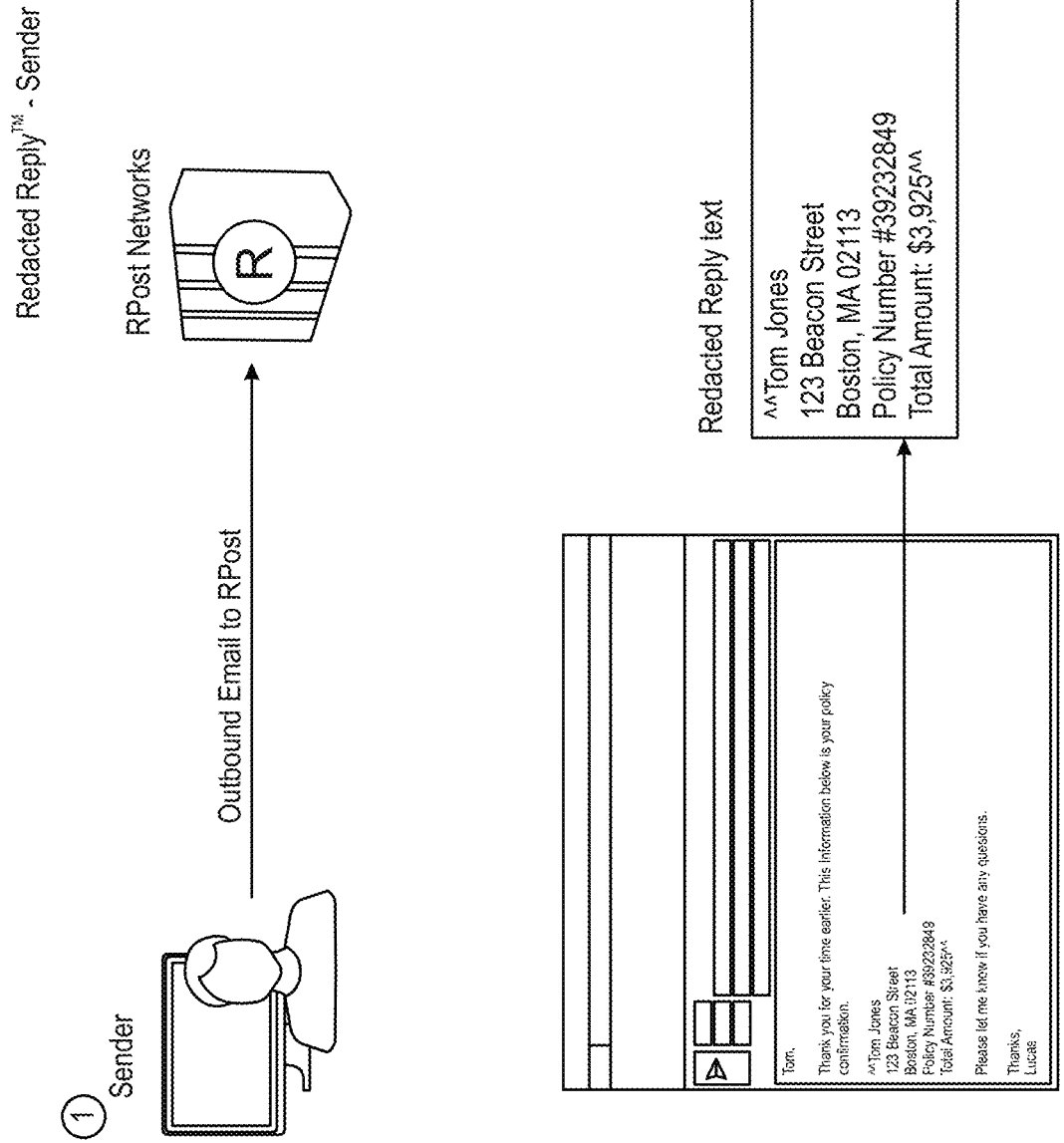
FIG. 8 is a schematic diagram of one aspect of the embodiment of FIG. 7.

FIG. 8 illustrates two options that are available to the sender when preparing an email message employing the redacted reply feature. In this exemplary illustration, in the first option, the sender inserts the redacted reply text inside up carrot symbols (shift 6). Various symbols can be used instead. Additionally, the redacted reply text can consist of many lines, spaces, and line breaks.

Figure 9:
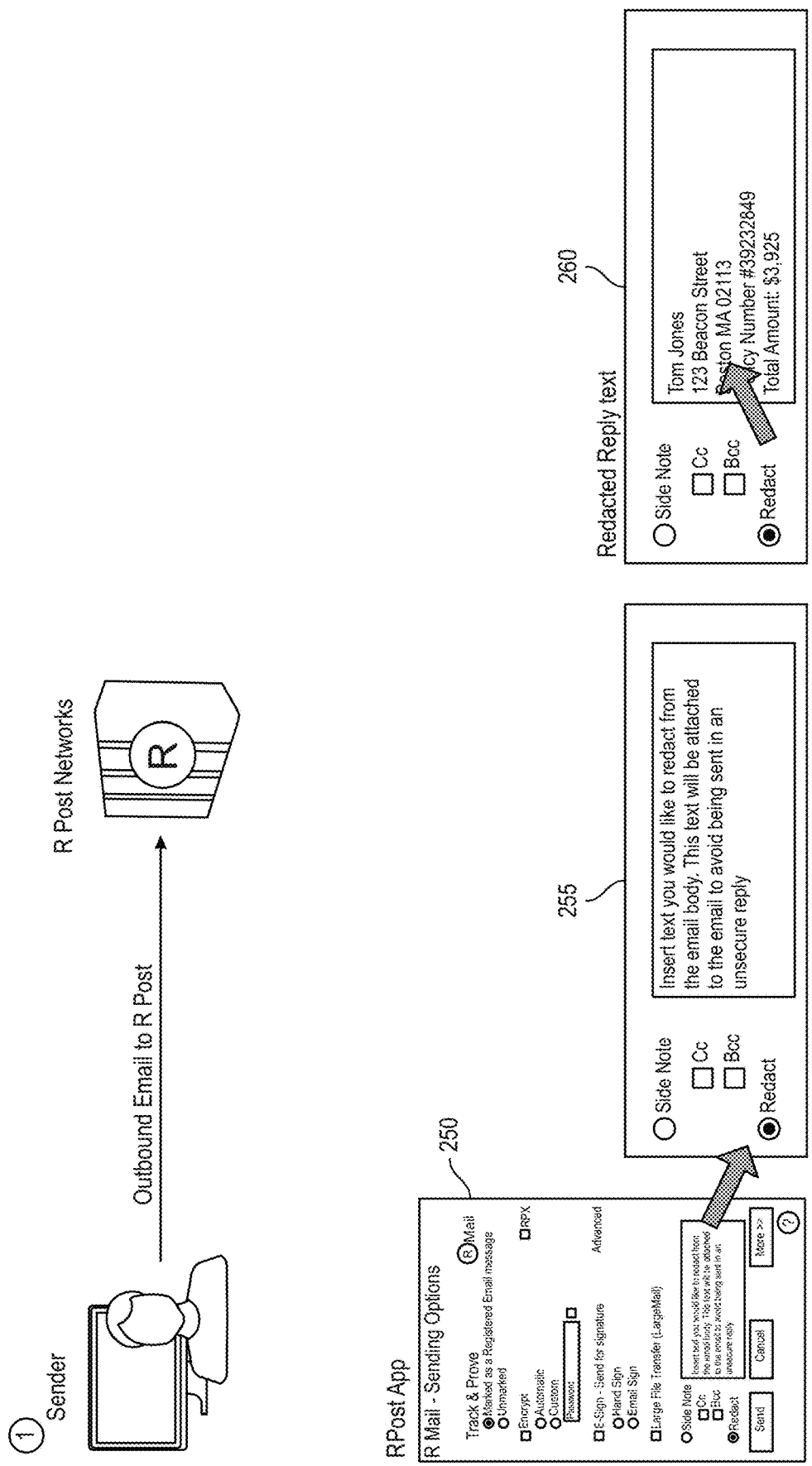
FIG. 9 is a schematic diagram of one aspect of the embodiment of FIG. 8.

FIG. 9 illustrates a second option available to the sender when preparing an email message employing the redacted reply feature. In this option, the user may insert the redacted reply text inside a Redacted Reply feature in a sending app used for the Rpost services. In one embodiment, as illustrated in FIG. 9, a user activates a menu from the RPost application 250 to activate a redact reply entry box 255 and inserts text to be redacted in the indicated box as shown in box 260.

Figure 10:
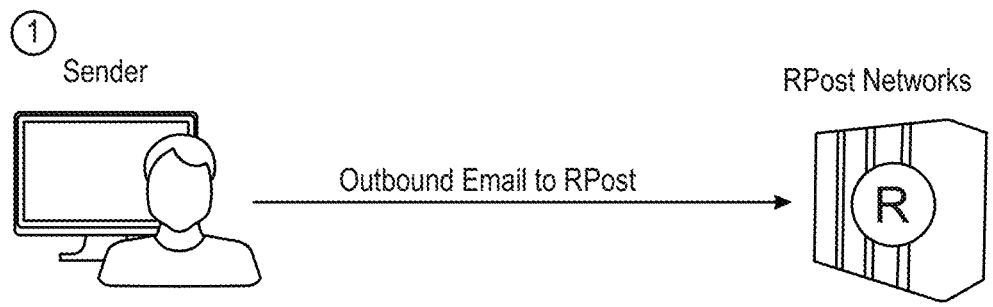
FIG. 10 is a schematic diagram of one aspect of the embodiment of FIG. 7.

FIG. 10 illustrates the path that email outbound from the sender (or the sender's server) to the RPost-networks for processing. The email is sent securely to the RPost-networks with the redacted reply text. The text will be included either in the body of the email inside the two up carrot symbols, or, in the encrypted data file sent by the RPost-application.

As shown in FIG. 11, the RPost-networks service extracts the redacted reply text from inside the two up carrot symbols or the data file sent from the RPost-application and processes the email according to the customer or user settings. The sender can configure the Rpost system to send the redacted reply text either as a text file attached to the outbound file, or to add a link associated with the redacted reply text to the message. The system may be used to configure the link with the following options: 1) lock the redacted reply text so it cannot be copies (yes/no); 2) allow the redacted reply text to be copied (yes/no); 3) add customer logo to the browser window (browse); 4) number of times the redacted reply text may be view, which may be set using a dropdown menu; 5) time allowed for viewing redacted reply text per view, which may be set using a dropdown menu; and 6) display selected text in a browser window, such as, for example: "The following information is private. If you are not an intended recipient of confidential and privileged information in this email, please delete it immediately. Do not disseminate this information."

Figure 12:
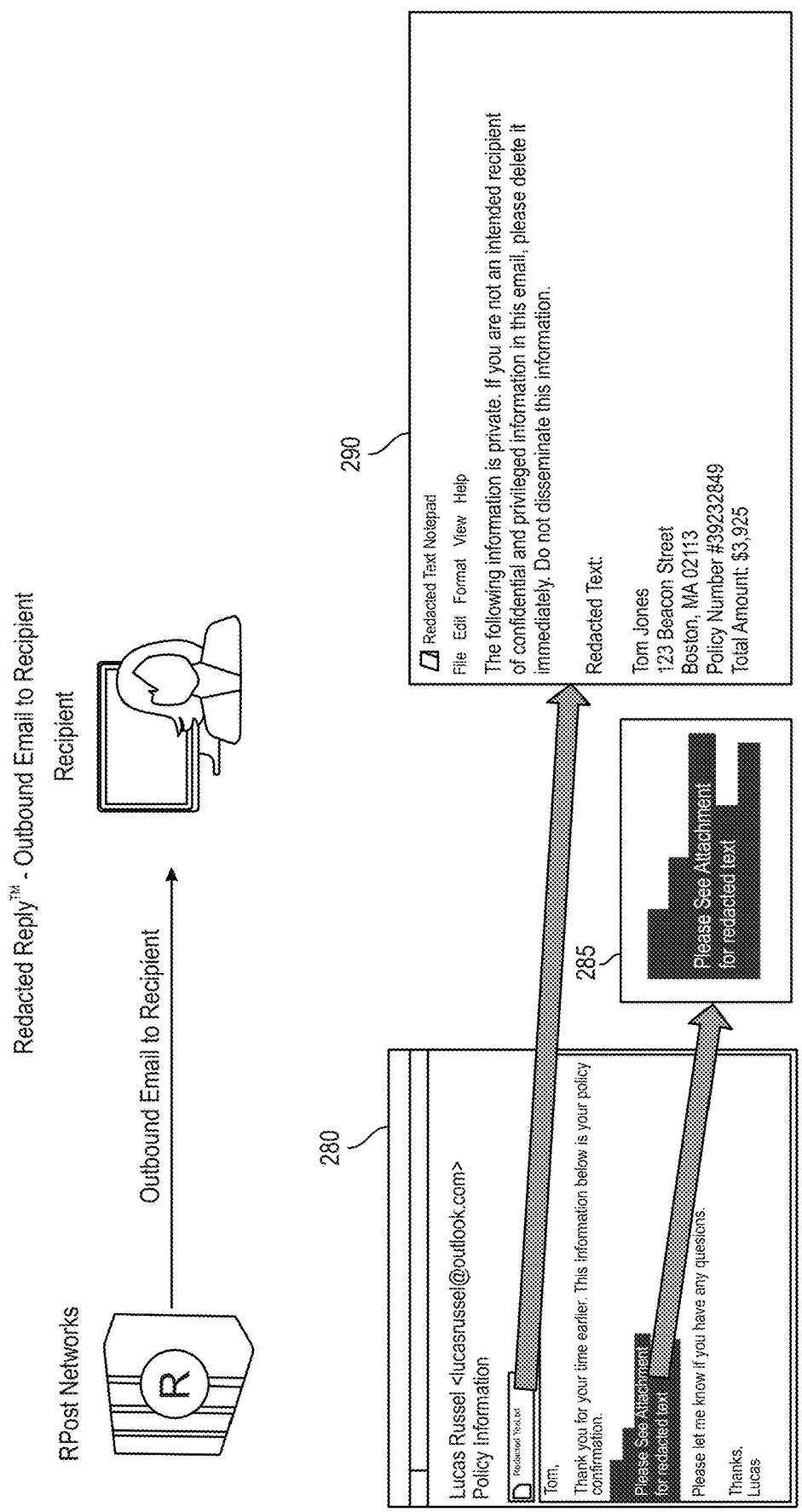
FIG. 12 is a schematic diagram of one aspect of the embodiment of FIG. 11.

FIG. 12 illustrates an exemplary outbound email path from the RPost-networks to the recipient. The RPost-networks sends the email to the recipient according to the customer or user settings. In one optional embodiment, the system attaches the redacted reply content to the outbound message as a text file, as shown in box 280. The text file may be in other formats such as, for example, HTML, PDF, encrypted PDF, TIFF, JPG, etc. The files may also be encrypted using various methods, or the file may be unencrypted. As shown in FIG. 12, the recipient is presented with an electronic message (email) containing redacted reply text attachment as shown in box 280, including a message in the email indicating that the attachment contains redacted text (box 285). Clicking on the attachment opens a window containing the redacted reply text, as shown in box 290.

Figure 13:
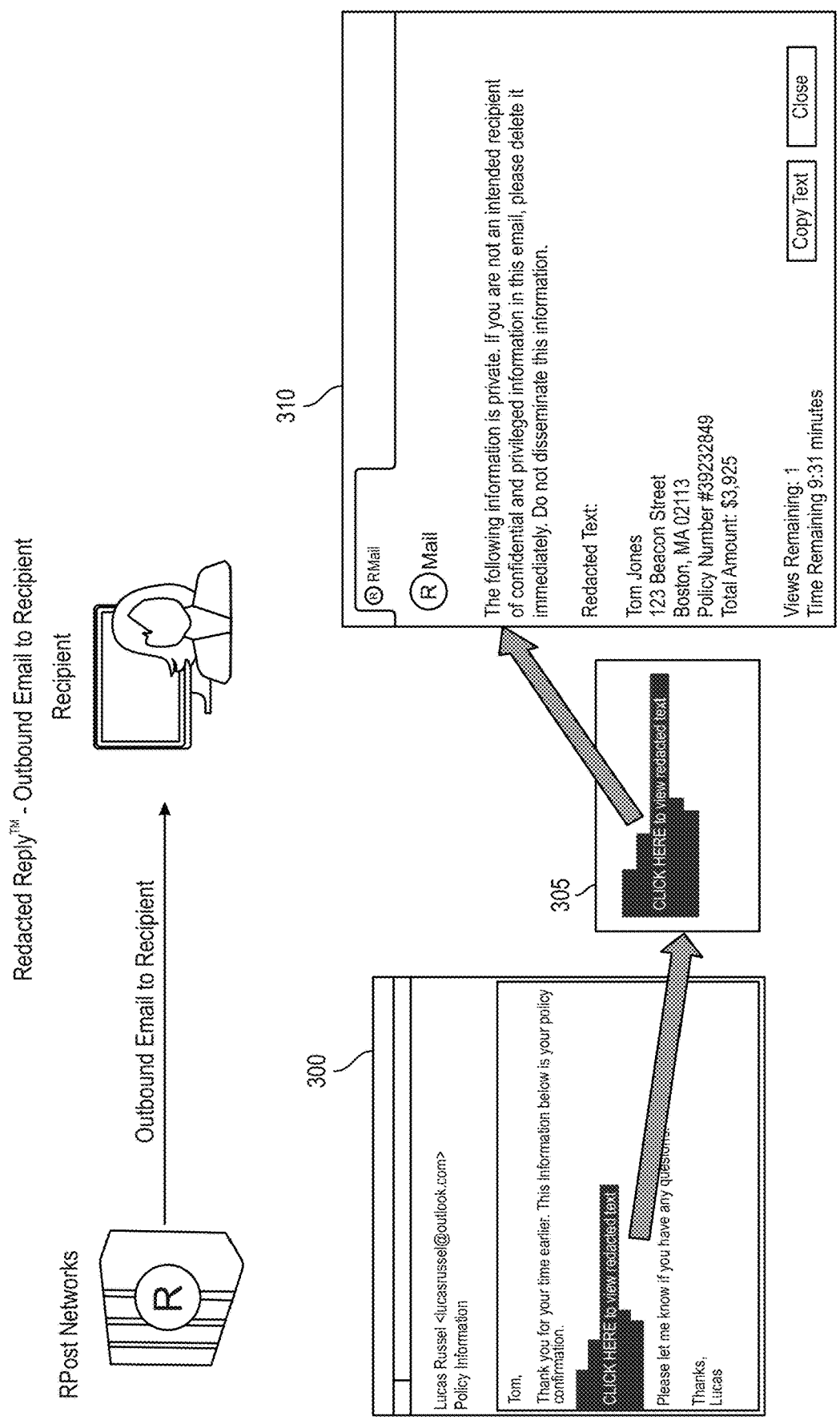
FIG. 13 is a schematic diagram of one aspect of the embodiment of FIG. 11.

In a second exemplary option, the system inserts a link to the redacted reply text inside the email body, as illustrated in FIG. 13. In this option, the user may open a browser window by clicking on the link to view the redacted reply text. The Rpost networks system adds a link to the outgoing email being transmitted to the recipient. When the email is opened by the recipient in box 300, a message 305 is presented to the recipient containing text informing the recipient that the redacted reply text may be viewed by clicking on the link. Clicking on the link causes the redacted reply text to be displayed to the recipient, as shown in box 310.

FIG. 14 illustrates various browser window settings that can be configured by a sender to configure the action of the link (FIG. 13) when the recipient activates the link. For example, the link may be configured with the following options: 1) lock the redacted reply text so it cannot be copies (yes/no); 2) allow the redacted reply text to be copied (yes/no); 3) add customer logo to the browser window (browse); 4) number of times the redacted reply text may be view, which may be set using a dropdown menu; 5) time allowed for viewing redacted reply text per view, which may be set using a dropdown menu; and 6) display selected text in a browser window, such as, for example: "The following information is private. If you are not an intended recipient of confidential and privileged information in this email, please delete it immediately. Do not disseminate this information" (box 320).

FIG. 15 illustrates one another embodiment of a redacted reply text window in accordance with the user settings. In this embodiment, the recipient receives the email containing the redacted reply text contained in the email, or in a browser window, as shown in box 330.

Figure 16:
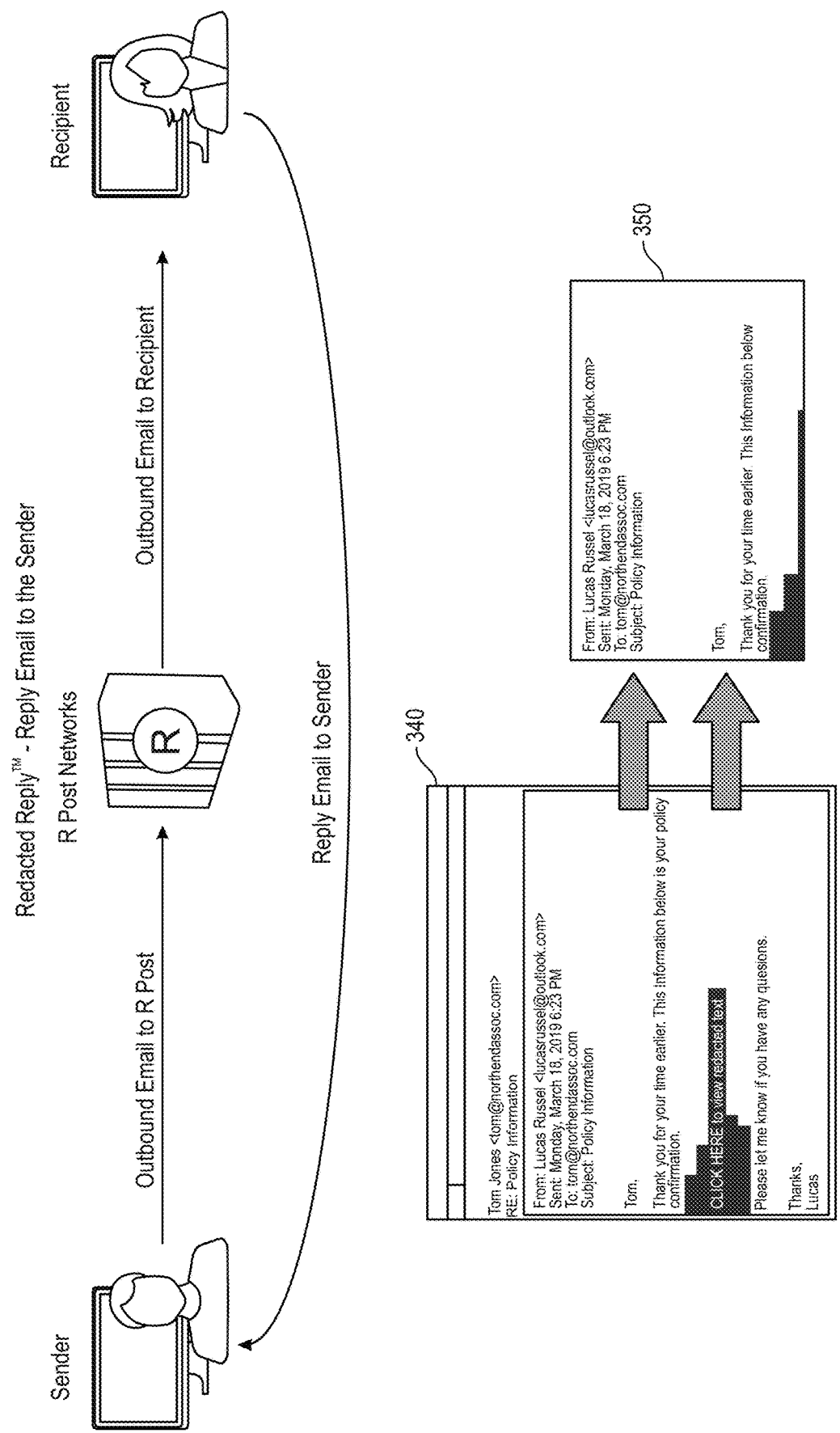
FIG. 16 is a schematic diagram of an embodiment of the present disclosure illustrating processing of a reply transmitted from the recipient of the message of the embodiment of FIG. 7.

FIG. 16 illustrates an exemplary embodiment of a process that takes place if a recipient replies back to the sender. When this occurs, the redacted text is not visible in the reply message because it is either not attached with the reply or is still redacted, as shown in boxes 340, 350. The link to view the redacted text, may, as set forth above, be configured to have an IP and/or instance call limit so if the link is clicked in the future, the browser window will display, for example, the text "the redacted text has expired. Contact the sender for more information."

Figure 18:
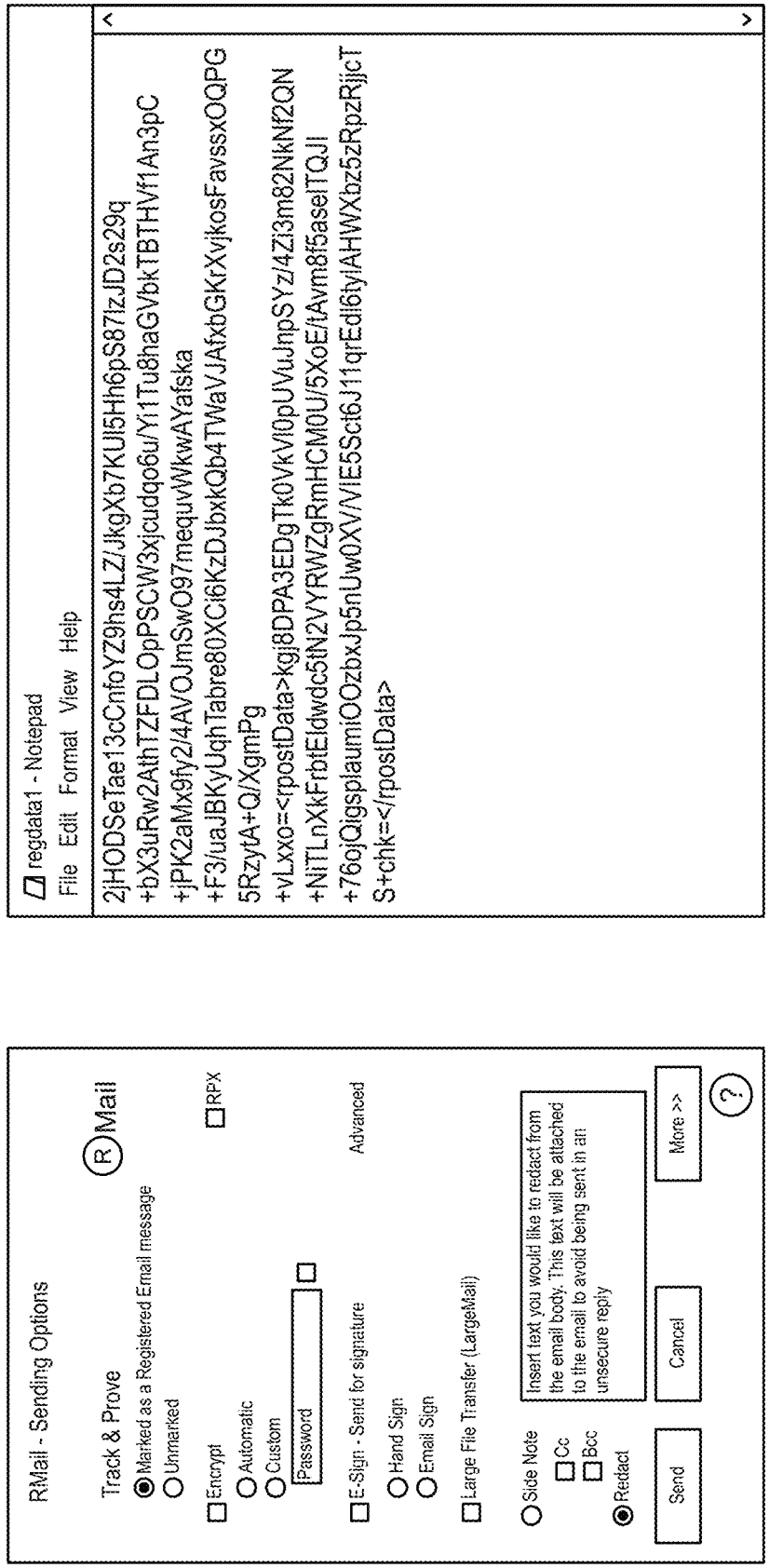
FIG. 18 is a graphical view of a menu used in a system in accordance with the various embodiments of the disclosure.

FIG. 17 illustrates exemplary setting menus of one embodiment of the invention that may be used to configure the system to serve the needs of the sender or the sender's organization. For example, the redact option may be set to pre-select an encryption option, that will encrypt the redacted text. As shown in FIG. 18, the original text to be redacted may be extracted at the sender's system and encrypted and sent as an attachment, or alternatively, may be sent in the header of the message, and transmitted to the RPost networks.

Figure 19:
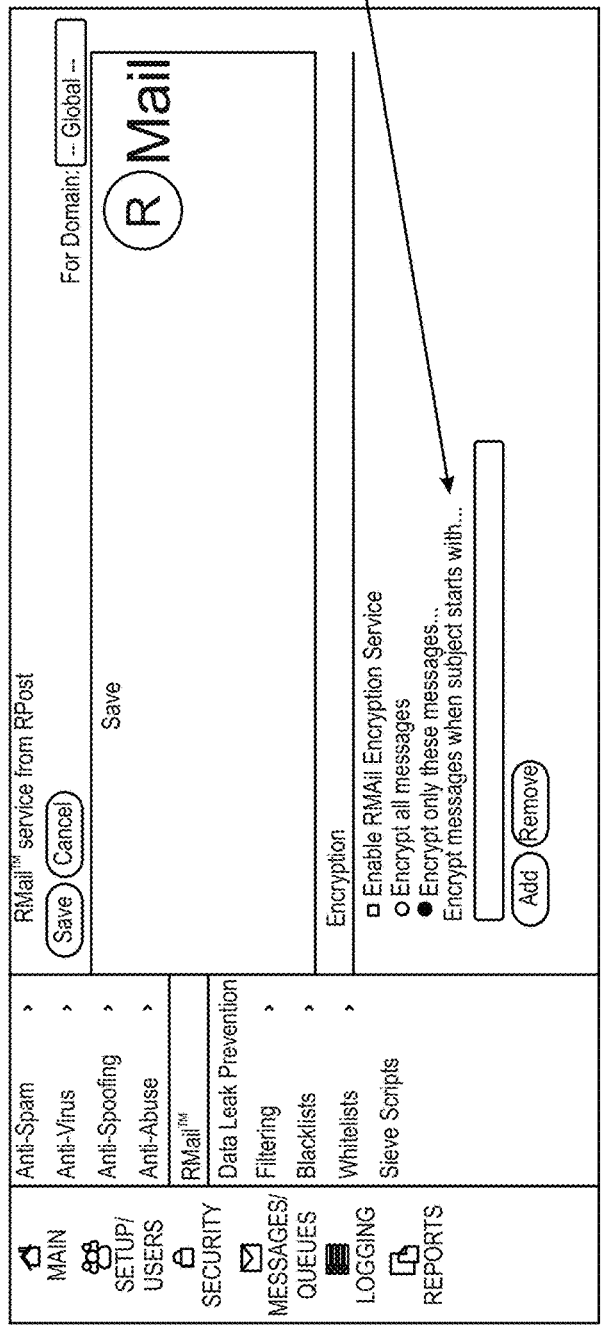
FIG. 19 is a graphical view of an exemplary screen shot showing features of the various embodiments of the present disclosure.
Figure 20:
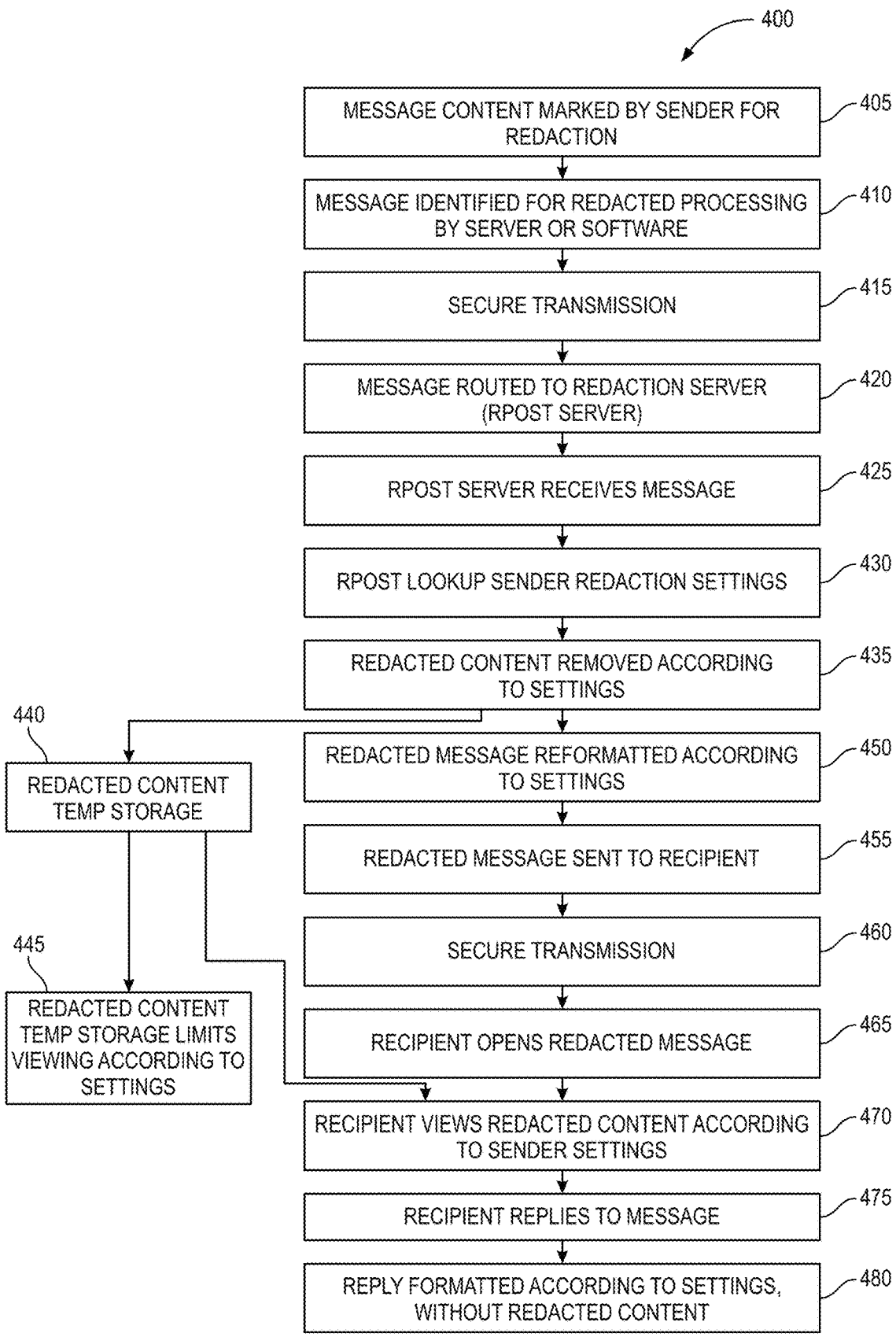
FIG. 20 is a flow chart illustrating the steps of a redacted reply embodiment of the present disclosure.

FIG. 19 illustrates an another embodiment wherein the redact option may be set to pre-select text based on content indicators to process messages at an outbound email gateway server using DLP or filtering rules FIG. 20 is a flowchart illustrating one embodiment of a system incorporating the redacted reply system 400. This system is used by a sender that is registered and permitted to use services provided by a Rpost server. Message content is marked by a sender for redaction in box 405. In box 410, the messages identified for redacted processing by the server or software, which software can be located at a server, or at a user's client system. One option that can be selected, as illustrated in the box 415, is that the message may then be transmitted to the RPost-server by secured transmission.

In box 420, the messages are routed to the redaction server. The messages received at the RPost-server are then processed by the processes running on the RPost-server which then look up to determine the redaction settings that were set up by the sender, in box 430. In box 435, the redacted content is removed from the message according to the settings determined in box 430. In one embodiment, the redacted content is stored temporarily in a memory in box 440. In another embodiment, storage of the redacted content may be configured to limit the viewing rights of a user or recipient desiring to view the redacted content in box 445.

In another embodiment, the redacted messages are reformatted in box 450 in accordance with format settings that were determined by the system in box 430. The redacted message is transmitted to the recipient in box 455, which transmission may be accomplished through a secured transmission route, as indicated in box 460. The recipient opens the redacted message in box 465, and views the redacted content according to the sender settings in box 470. As shown in FIG. 19, the recipient may alternatively view the redacted content in box 470 by clicking on a link stored in the message that activates the system to provide the redacted content temporarily stored in the memory to the recipient.

In another embodiment, the process may branch from box 440 directly to box 470, wherein the recipient may view the redacted content in accordance with the sender settings. As set forth above in other embodiments, the recipient may reply to the message in box 475, and the reply message may be configured and formatted in box 480 of FIG. 20 in accordance with the settings established above, without including the redacted content.

Figure 21:
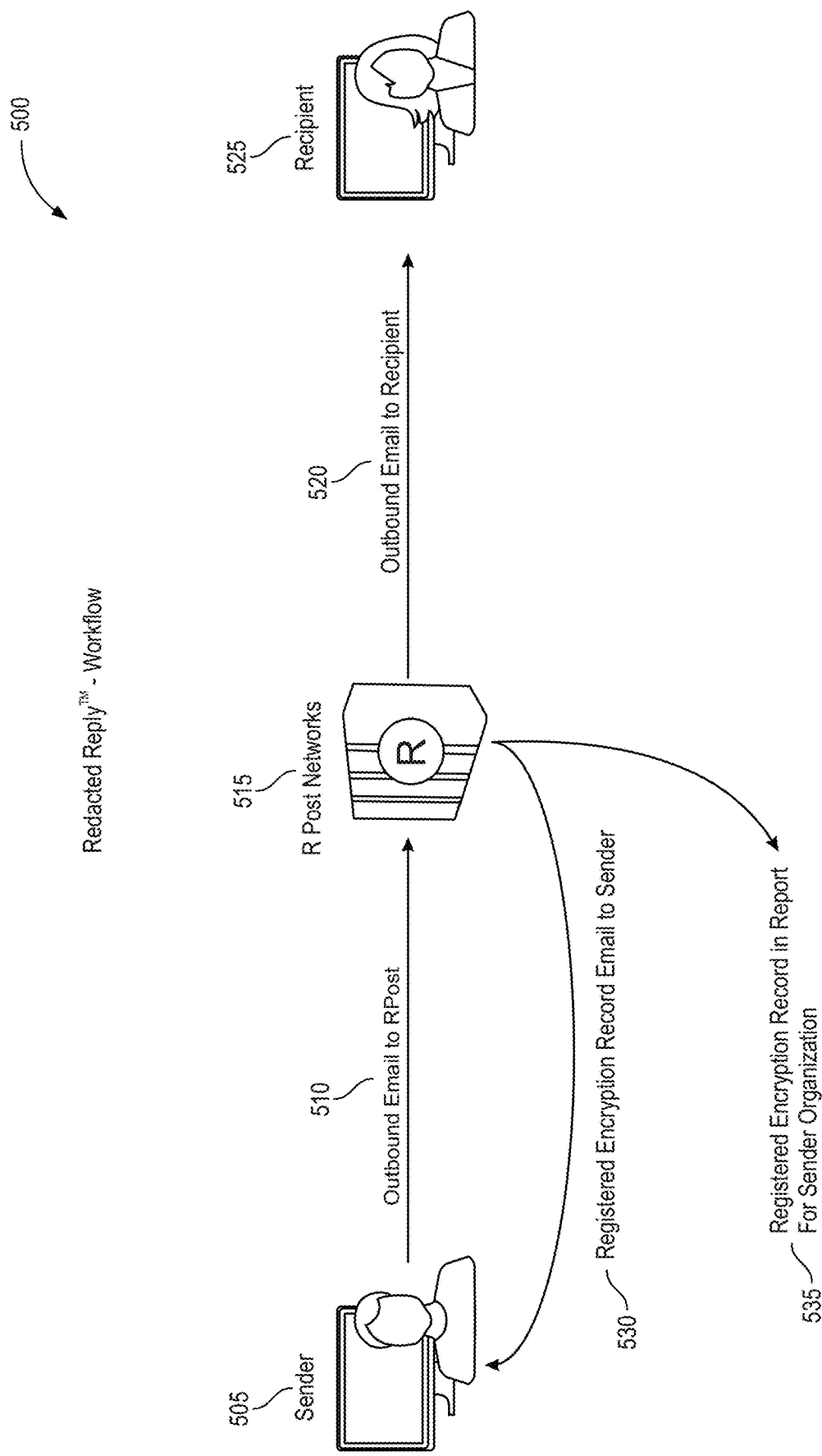
FIG. 21 is a schematic view of one registered encryption embodiment of the present disclosure.

FIG. 21 illustrates an exemplary embodiment of a workflow 400 utilized to carryout the disclosed registered encryption embodiments set forth above. In the exemplary embodiment, a sender 505 sends an outbound email 510 to a server 515 providing the registered encryption service. After processing, the outbound email 520 is then transmitted to a recipient 525. Prior, simultaneous to, or after transmitting the processed email to the recipient, the system transmits a registered encryption record email to the sender at 530, and may also send a registered encryption record in a report intended for the sender's organization 535.

When the sender 505 sends the message 510, and intends the email to be transmitted to recipient securely or encrypted, the server on the sender side (or the sender) is intended to transmit the message with a form of encryption, which may be either a secure transmission utilizing HTTPS, TLS, or other protocol, or a message secured at the message level utilizing PKI, PGP, or other encryption system. The RPost Networks server 515 may be embodied in software at the sender's system, the sender's email server, the sender's gateway, or an intermediate server.

When the sender's email 510 is received at the Rpost Networks server 515, the server identifies if the message has been encrypted with message level encryption. If so, the server 515 decrypts the message with an appropriate decryption method and logs the fact the decryption was carried out, and the method of decryption, along with time stamps and message ID and other identifiers, as programmed by the server operators. The server then processes the message for delivery to the recipient with the sender's desired level and method of encryption.

If the message is not message level encrypted, the server 515 processes the message for delivery to the recipient with the sender's desired level and method of encryption. At the time the message is received, or after the message continues to the recipient, the server 515 parses the inbound message header data and identifiers from the message heater data from the last hop and searches to secure transmission information (i.e. TLSv1.2), and records the fact of identification of secure transmission protocol information and places an identifier in a database in communication with the server along with message identifiers, and hop server identifiers and records secure transmission information hierarchical from the most recently received hop. FIG. 22 depicts the type of information that the server receives from the inbound message header from the sender that may be parsed and copied into a database.

On the email received inbound from sender at the server, there will be a series of headers in order of the last hop. (i.e. a sender to exchange server to gateway server to perimeter server service to the processing server gate—each may or may not have a TLS secure level of transmission and may have different TLS security levels. The processing server records this header, and runs a program on it to parse out at least "Last Received From Server Name/Secure by TSL (protocol level)" with the option to see the previous hops, with the analysis moot (overridden) if the received message is message-level encrypted. In alternative embodiments, the sender organization may opt for level of view (last hop, all hops) with security determination on last hop only or all hops. Since the parsing of the email headers on messages received inbound from a sender at the processing server may be processor intensive, this parsing may be done after the message moves onward in the process to the recipient. The parsed/copied content from the headers are placed in a database and categorized based on a hierarchy of what is important for sender security (i.e. Best, Acceptable, Fail).

After processing of the email 510 is completed by the server 515, server 515 transmits the processed message as an outbound email 520 to the recipient in accordance to the customer or user security settings. The message 520 is transmitted to the recipient 525 according to the sender's secure transmission preferences. If the message is processed for message level security, the fact of re-encrypting the message at the RPost server is recorded, associated with the message ID and method of encryption, timestamps, etc. If the message is processed for secure transmission (i.e. TLS), after transmission, the SMTP/ESMTP or message transport protocol information if other protocol (i.e. HTTP) is recorded and parsed for the portions that determine fact of secure transmission and details about the secure transmission protocol successfully used in the transmission (i.e. TLS1.2). This protocol information is stored in a database associated with the message ID and received security information. The parsed/copied message sending protocol parts placed in a database are categorized based on a hierarchy of what is important for sender security (i.e. Best, Acceptable, Fail).

Referring once again to FIG. 21 at boxes 530, 535, server 515 may be configured to provide a record of the encryption of the email, to the sender, and/or the sender's organization. In this process, the parsed/copied message sending protocol parts are placed in a database and are categorized based on a hierarchy of what is important for sender security (i.e. Best, Acceptable, Fail). The (received from sender) and (sent to recipient) categorizations are matched, with a chart to display the result (interpretation) and the protocol/method data, along with a sum of the security level which may be set to be the higher of the sum of the (received from sender) and (sent to recipient) levels.

FIG. 23 illustrates various examples of one or more embodiments of processes for performing registered encryption analysis on an email provided by a sender or sender's server. For example, if the received from sender parameter is equal to "best", and the sent to recipient parameter is equal to "acceptable", then the overall result is "acceptable." In another example, where the received from sender parameter is "best", but the sent to recipient parameter is "fail", the overall result is "fail." In another example, where the received from sender parameter is "acceptable", and the sent to recipient parameter is "acceptable", the overall result is "acceptable."

FIG. 24 depicts a table 600 including various parameters associated with a sender and showing a status 615 of messages sent from a sender to various recipients 610 that may be provided by a server to the sender in various embodiments of the present invention. In a first example, analysis of a message from Bob to Sue provides the results: [received from)=Best; (sent to recipient)=Best; resulting in an overall result of Best. In a second example, shown in row three of the table, the email from Bob to Jim results in the results: (received from sender)=Fail; (sent to recipient) =Best; resulting in an overall result of Fail. A report such as depicted in FIG. 28 may contain data that may later be submitted for authenticating.

FIG. 25 depicts a table including various parameters associated with a sender 605 and showing a status of messages sent from a sender to various recipients 610 that may be provided by a server to the sender, including an security report 650 related to the messages in various embodiments of the present invention.

Figure 26:
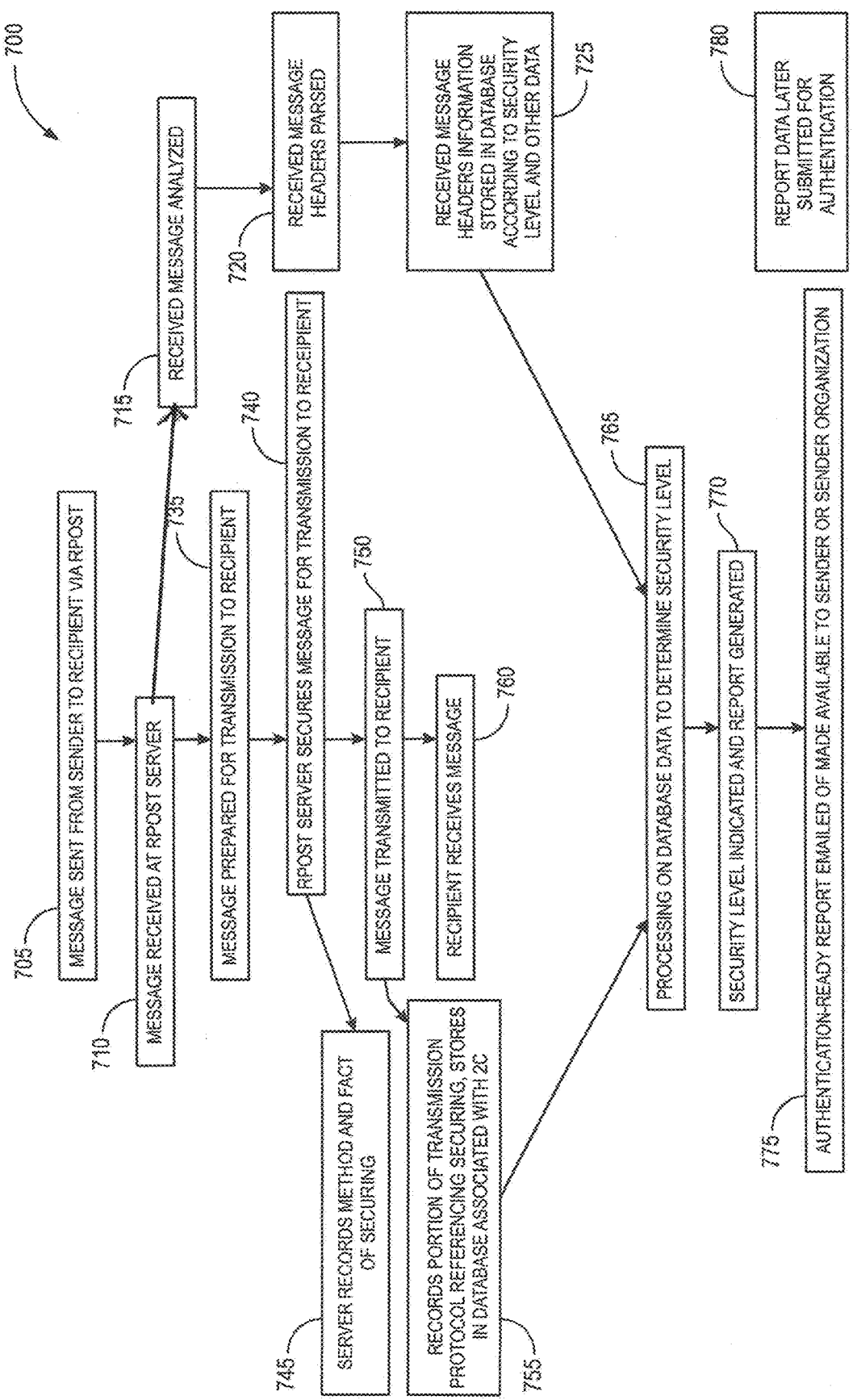
FIG. 26 is a flow chart illustrating various steps of an embodiment of a registered encryption process in accordance with the present disclosure.

FIG. 26 is a flow chart illustrating an embodiment of a process workflow 700 that may be carried out by the registered encryption process. In box 705, a message sent from a sender to a recipient via a processing server. The message is received at the processing service at box 710. The process may then branch to box 715, wherein the received message is analyzed at the processing server wherein the message headers are parsed in box 720, where the received message headers information is stored in a database in accordance with a security level and other parameters in box 725.

Returning again to box 710, the message is further processed in box 735 where the processing server prepares the message for transmission to the recipient. At box 740, the processing server secures the message for transmission to the recipient. The process may branch to box 745 where the processing server records the method and fact of securing the message.

After the process of box 740, the message is transmitted to the recipient at box 750, who receives the message at box 760.

Returning to box 740, the system may also record at least a portion of the transmission protocol used to transmit the message to the recipient, and store it in a database associated with the server in box 755.

Referring now to box 765, the database may process the database data to determine the security level of a message, and a report may be generated referencing the security level in box 770. An authentication ready report may be emailed or otherwise made available to the sender or sender organization in box 775. In another embodiment, the report data may be submitted for authentication in box 780.

Redacted Reply with AMP HTML Email Format Embodiment

An alternative embodiment is to use AMPHTML Email Format in a manner that displays the content identified for redaction IN THE BODY of the message AMP version of the email, text/x-amp-html, with the text marked for redaction viewed FROM THE LINK/IMAGE in the HTML version and Plaintext versions of the MIME parts of the email.

Figure 27:
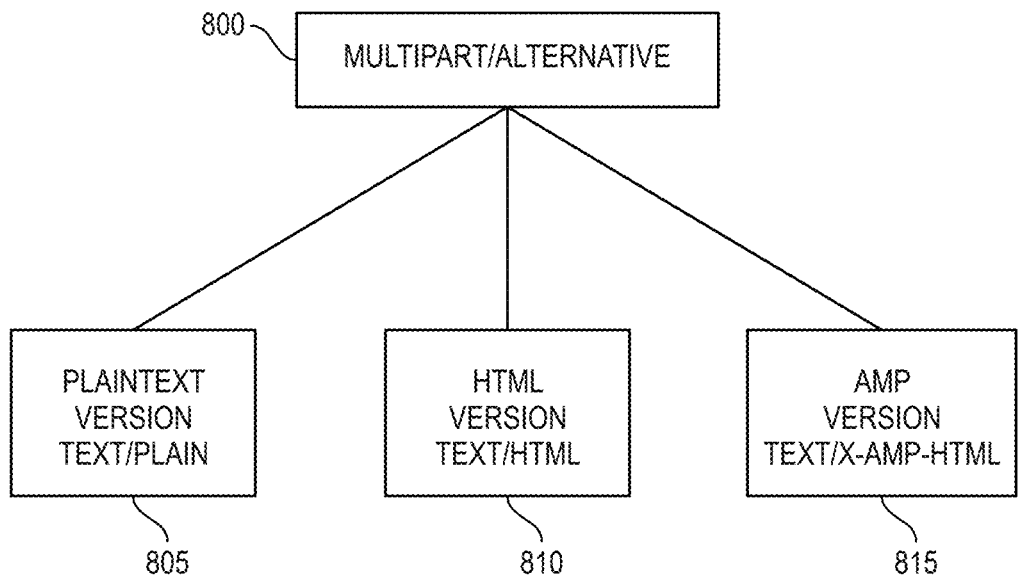
FIG. 27 is a block diagram depicting an arrangement of electronic message header portions.

As is depicted by the schematic representation in FIG. 27, an email is structured as MIME tree that contains the message body and any attachments to the email. Embedding AMP within an email adds a new MIME part with a content type of text/x-amp-html 815 as a descendant of multipart/alternative 800. It is alongside the existing text/html 805 or text/plain parts 810. This ensures that the email message works on all clients. In this embodiment, the text/x-amp-html part must be under a multipart/alternative node and with the text/x-amp-html MIME part placed before the text/html MIME part. An example of this arrangement is shown in the code set forth below:

```
From: Person A <persona@gmail.com>
To:   Person B <personb@gmail.com.
Subject:      An AMP email!
Content-Type: multipart/alternative;
boundary="001a114634ac3555ae05525685ae"
--001a114634ac3555ae05525685ae
Content-type: txt/plain; charset="UTF-8"; format=flowed; delsp=yes
Hello World in plain text!
--001a114634ac3555ae05525685ae
Content-type: text/x-amp-html; charset-"UTF-8"
<!doctype html>
<html ⚡4email>
<head>
    <meta charset="utf-8">
    <style amp4email-boilerplate>body{visibility:hidden}<style>
    <script async src=https://cdn.ampproiect.org/v0.js></script>
</head>
<body>
Hello World in AMP!
</body>
</html>
--001a114634ac3555ae05525685ae
Content-Type: text/html; charset="UTF-8"
<span>Hello World in Html!</span>
--001a114634ac3555ae05525685ae
```

In this embodiment, because email clients that can read AMP email parts are required to strip out the text/x-amp-html part of the MIME tree when a user replies to or forwards an AMP email message, it would be safe to send the message with the content targeted for redaction visible in the message body of ONLY the AMP part of the email as this entire message content is redacted when replying (the AMP part of the message is not included in the reply) and the HTML and/or TEXT part of the message remain as described in earlier embodiments to redact text designated for redaction in the reply.

This is why it is important that an email in this embodiment provide alternative content in the HTML and TEXT parts that would contain the link to image view of the content tagged for redaction or the content tagged for redaction would additionally need to be placed in the attachment and not in the HTML and TEXT parts of the message (as per the other embodiments described).

Further, in this embodiment, in the AMP part of the message, the content that is marked for redaction can be set with dynamic properties, for example view content once and replace with alternative content upon message refresh, or view content and permit the user to indicate in the dynamic AMP content that the message content has been read or accepted, and then the dynamic content does not show for that recipient.

AMP is a technology known for developing superfast web pages on mobile clients. AMP is a set of HTML tags backed by JavaScript that easily enables functionality with an added focus on performance and security.

The AMPHTML Email format provides a subset of AMP components that you can use in email messages. Recipients of AMP emails can view and interact with the AMP components directly in the email.

An AMP email message must be formatted as |Rule|Description|||Start with the <!doctype html> doctype.|Standard for HTML.||Contain a top-level <html ⚡4email> tag. (<html amp4email> is accepted as well)|Identifies the document as AMPHTML Email.||Contain <head> and <body> tags.|Optional in HTML but not in AMPHTML Email.||Contain a <meta chrset="utf-8"> as the first child of their <head tag>.|Identifies the encoding for the page.||Contain the amp4email boilerplate in the <head>: <style amp4email-boilerplate>body{visibility hidden}</style><script async src="https://cdn.ampproject.org/v0.js"></script>|CSS boilerplate to initially hide the content until AMP JS is loaded.|

Additional Embodiments with AMP Format

Further in this embodiment, there can be detection whether the recipient mail client can accept AMP viewing and if so, use only the AMP version of the message and leave the redacted content entirely out of the Text and HTMP parts of the MIME message format.

This knowledge of recipient ability to view an AMP formatted message can be done by using the AMP open detection pixel tracking, and if the AMP content is calling the pixel/image, then the server can store in its database that this user has AMP viewing capabilities and display for future messages the content market for redaction in the AMP version of the message and leave the redacted content entirely out of the Text and HTMP parts of the MIME message format of the message.

Further to the Registered Encryption embodiment, the server can record in the database associated with the message whether the delivered private content was in the AMP message format and excluded from the HTML and Text MIME parts so that it may be recorded that the reply content would be automatically redacted.

Although the disclosed heat exchange system has been described hereabove with reference to certain examples or embodiments, various additions, deletions, alterations and modifications may be made to those described examples and embodiments without departing from the intended spirit and scope of the disclosed system and method for verification of encrypted electronic message delivery and preventing accidental disclosure of sensitive message parts in replies. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any embodiment or example described herein may optionally exist or be utilized in the absence or substantial absence of any other element, step, member, component, composition, reactant, part or portion unless otherwise noted. All reasonable additions, deletions, modifications and alterations are to be considered equivalents of the described examples and embodiments and are to be included within the scope of the following claims. The disclosure is limited only by the scope of the appended claims.

I claim:

1. A system for providing a registered encryption service for an email system, comprising:
    a processor in communication with at least one memory;
    a server configured in accordance with the processor and memory, the processor and server remote from a recipient, the server programmed to
    receive a message from a sender associated with the system,
    parse one or more headers of the message received from the sender of the message,
    store information associated with the one or more parsed headers in a database stored on one of the at least one memory according to a security level or other data provided by the sender of the received message,
    secure the received message in accordance with the security level or other data provided by the sender of the received message for transmission to an intended recipient,
    transmit the secured message, and information associated with the secured message, to the intended recipient,
    process the information stored in the database to determine the security level of the transmitted message, and
    generate a report related to the transmitted secured message and including an indication of the determined security level of the transmitted secured message and transmit the report to the sender.

2. The system of claim 1, wherein the generated report is an authentication-ready report.

3. The system of claim 2, wherein the authentication-ready report is transmitted to the sender.

4. The system of claim 1, wherein the server is further programmed to store a record of a method used to secure the received message in a database stored in one of the at least one memory.

5. The system of claim 1, wherein the server is further programmed to store a record including a portion of a transmission protocol used to transmit the secured message to the intended recipient in a database stored in one of the at least one memory.

6. The system of claim 1, wherein the server is further programmed to store a record of a method used to secure the message delivered to the intended recipient in a database stored in one of the at least one memory.

7. The system of claim 1, wherein the server is further programmed to store a record of a method used by the sender or sender server to secure the message received from the sender and the method used to secure the message sent to the intended recipient, in a database stored in one of the at least one memory.

8. The system of claim 1, wherein the server is further programmed to record the enablement of the redaction of content from the message transmitted to the intended recipient.

* * * * *